(12) United States Patent
Lee et al.

(10) Patent No.: US 11,068,102 B2
(45) Date of Patent: Jul. 20, 2021

(54) DISPLAY DEVICE

(71) Applicant: Samsung Display Co., Ltd., Yongin-si (KR)

(72) Inventors: Hyeon Jun Lee, Seoul (KR); Won Ki Hong, Suwon-si (KR); So Hee Park, Cheonan-si (KR); Hee Seomoon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/928,360

(22) Filed: Jul. 14, 2020

(65) Prior Publication Data

US 2021/0132727 A1 May 6, 2021

(30) Foreign Application Priority Data

Nov. 6, 2019 (KR) .......................... 10-2019-0140707

(51) Int. Cl.
*G06F 3/041* (2006.01)

(52) U.S. Cl.
CPC .......... *G06F 3/0414* (2013.01); *G06F 3/0416* (2013.01)

(58) Field of Classification Search
CPC .............................. G06F 3/0414; G06F 3/0416
See application file for complete search history.

(56) References Cited

U.S. PATENT DOCUMENTS

| | | | |
|---|---|---|---|
| 7,538,760 B2 | 5/2009 | Hotelling et al. | |
| 2004/0212583 A1* | 10/2004 | Cobian | G06F 3/0414 345/156 |
| 2014/0028575 A1 | 1/2014 | Parivar et al. | |
| 2014/0085213 A1 | 3/2014 | Huppi et al. | |
| 2014/0091857 A1 | 4/2014 | Bernstein | |
| 2014/0092064 A1 | 4/2014 | Bernstein et al. | |
| 2014/0293145 A1 | 10/2014 | Jones et al. | |
| 2016/0098132 A1* | 4/2016 | Kim | G06F 3/0416 345/173 |
| 2017/0168643 A1* | 6/2017 | Wang | G06F 3/0445 |
| 2018/0032209 A1* | 2/2018 | Suzuki | G06F 3/0446 |

* cited by examiner

*Primary Examiner* — Ryan A Lubit
(74) *Attorney, Agent, or Firm* — Lewis Roca Rothgerber Christie LLP

(57) ABSTRACT

A display device is provided. The display device includes: a display panel including a first area, a second area, and a folding area between the first area and the second area, and a force sensor at one surface of the display panel. The force sensor includes a plurality of first touch cells overlapping the first area or the second area, a plurality of second touch cells overlapping the folding area, and a touch driver which controls a threshold voltage of the plurality of second touch cells on the basis of an intensity of a base force of the plurality of second touch cells.

20 Claims, 21 Drawing Sheets

DISPLAY DEVICE

CROSS-REFERENCE TO RELATED APPLICATION

This application claims priority to and the benefit of Korean Patent Application No. 10-2019-0140707 filed on Nov. 6, 2019, in the Korean Intellectual Property Office, the entire disclosure of which is incorporated herein by reference.

BACKGROUND

1. Field

The present disclosure relates to a display device.

2. Description of the Related Art

Electronic devices, such as a smartphone, a tablet personal computer (PC), a digital camera, a laptop, a navigation system, and a smart television, that provide a user with images include a display device for displaying an image. The display device includes a display panel, which generates and displays an image, and various suitable input devices.

In recent years, touch panels that recognize a touch input have been widely applied mainly on smartphones or tablet PCs. Due to the convenience of a touch type or kind (e.g., a touch type or kind of touch panel), the touch panels may substitute for key pads or the like which are existing physical input devices. Research has been carried out on the use of touch panels, more specifically, force sensors, as input devices by being mounted on display devices.

SUMMARY

Aspects of the present disclosure are directed toward a display device capable of preventing or reducing malfunction of a force sensor by removing an afterimage by force on a plurality of touch cells that overlap a folding area when the display device is changed from a folding state to an unfolding state.

It should be noted that aspects of the present disclosure are not limited to the above-mentioned aspects, and other unmentioned aspects of the present disclosure will be apparent to those skilled in the art from the following descriptions.

According to one or more embodiments of the present disclosure, a display device includes: a display panel including a first area, a second area, and a folding area between the first area and the second area, and a force sensor at one surface of the display panel. The force sensor includes a plurality of first touch cells overlapping the first area or the second area, a plurality of second touch cells overlapping the folding area, and a touch driver to control a threshold voltage of the plurality of second touch cells on the basis of an intensity of a base force of the plurality of second touch cells.

After the folding area is changed from a folding state to an unfolding state, the touch driver may control the threshold voltage so that a difference between the intensity of the base force of the plurality of second touch cells and a magnitude of the threshold voltage is constant.

After the folding area is changed from a folding state to an unfolding state, the touch driver may control the threshold voltage of the plurality of second touch cells so that a difference between the intensity of the base force of the plurality of second touch cells and a magnitude of the threshold voltage of the plurality of second touch cells is substantially identical to a difference between an intensity of a base force of the plurality of first touch cells and a magnitude of a threshold voltage of the plurality of first touch cells.

After the folding area is changed from a folding state to an unfolding state, the touch driver may control a reduction rate of the threshold voltage of the plurality of second touch cells on the basis of a reduction rate of the base force of the plurality of second touch cells.

During a first period which is immediately after the folding area is changed from a folding state to an unfolding state, the touch driver may control the threshold voltage of the plurality of second touch cells on the basis of the base force of the plurality of second touch cells, and, during a second period in which the base force of the plurality of second touch cells is constant, the touch driver may maintain the threshold voltage of the plurality of second touch cells constant.

The touch driver includes: a base force detector to detect the intensity of the base force of the plurality of second touch cells after the folding area is changed from a folding state to an unfolding state, and a threshold voltage controller to control the threshold voltage of the plurality of second touch cells so that a size of a reference force, which is a difference between the intensity of the base force of the plurality of second touch cells and magnitude of the threshold voltage of the plurality of second touch cells, is maintained constant.

The touch driver may further include a touch force detector to receive sensing data exceeding the size of the reference force to detect a touch force exerted on the plurality of second touch cells.

According to one or more embodiments of the present disclosure, a display device includes: a display panel which is foldable in at least one direction, and a force sensor at one surface of the display panel. The force sensor includes a plurality of touch cells to sense a touch force, and a touch driver which, after the display panel is changed from a folding state to an unfolding state, is to detect some touch cells whose base force is relatively increased from among the plurality of touch cells to control a threshold voltage of the detected touch cells on the basis of an intensity of the base force of the detected touch cells.

After the display panel is changed from a folding state to an unfolding state in a folding area extending in a direction parallel to a short side of the display panel: a base force of some touch cells that overlap the folding area from among the plurality of touch cells may be increased, and the touch driver may control a threshold voltage of the some touch cells that overlap the folding area, on the basis of the intensity of the base force of the some touch cells that overlap the folding area.

After the display panel is changed from a folding state to an unfolding state in a folding area extending in a direction parallel to a long side of the display panel: a base force of some touch cells that overlap the folding area from among the plurality of touch cells may be increased, and the touch driver may control a threshold voltage of the some touch cells that overlap the folding area, on the basis of the intensity of the base force of the some touch cells that overlap the folding area.

After the display panel is changed from a folding state to an unfolding state in a folding area extending in a diagonal direction between a short-side direction and a long-side direction of the display panel: a base force of some touch cells that overlap the folding area from among the plurality of touch cells may be increased, and the touch driver may control a threshold voltage of the some touch cells that overlap the folding area, on the basis of the intensity of the base force of the some touch cells that overlap the folding area.

The touch driver includes: a folding area detector to detect some touch cells whose base force is increased from among the plurality of touch cells after the display panel is changed from a folding state to an unfolding state, a base force detector to detect an intensity of the base force of the detected touch cells, and a threshold voltage controller to control a threshold voltage of the detected touch cells.

The threshold voltage controller may control the threshold voltage of the detected touch cells to maintain a size of a reference force, which is a difference between the intensity of the base force of the detected touch cells and a magnitude of the threshold voltage of the detected touch cells, constant.

The touch driver may further include a touch force detector to receive sensing data exceeding the size of the reference force to detect a touch force exerted on the detected touch cells.

According to one or more embodiments of the present disclosure, a display device includes: a display panel to display an image, and a force sensor at one surface of the display panel. The force sensor includes a plurality of touch cells to sense a touch force, and a touch driver to detect some touch cells whose base force is relatively increased from among the plurality of touch cells to control a threshold voltage of the detected some touch cells on the basis of an intensity of the base force of the detected some touch cells.

After the base force of the detected touch cells exceeds a set force during a reference time, the touch driver may control the threshold voltage of the detected touch cells on the basis of the intensity of the base force of the detected touch cells.

After a size of a reference force, which is a difference between the intensity of the base force of the detected touch cells and a magnitude of the threshold voltage of the detected touch cells, exceeds a size of a set force, the touch driver may control the threshold voltage to decrease the size of the reference force.

After the base force of the detected touch cells exceeds a set force during a reference time, the touch driver may control a reduction rate of the threshold voltage of the detected touch cells on the basis of a reduction rate of the base force of the detected touch cells.

The touch driver includes: an afterimage-by-force detector to detect some touch cells whose base force exceeds a set force during a reference time from among the plurality of touch cells, a base force detector to detect an intensity of the base force of the detected touch cells, and a threshold voltage controller to controls the threshold voltage of the detected touch cells so that a size of a reference force, which is a difference between the intensity of the base force of the detected touch cells and a magnitude of the threshold voltage of the detected touch cells, is maintained constant.

The touch driver may further include a touch force detector to receive sensing data exceeding the size of the reference force to detect a touch force exerted on the detected touch cells.

BRIEF DESCRIPTION OF THE DRAWINGS

The above and other aspects and features of the present disclosure will become more apparent by describing example embodiments thereof in more detail with reference to the attached drawings, in which.

DETAILED DESCRIPTION

Figure 1:
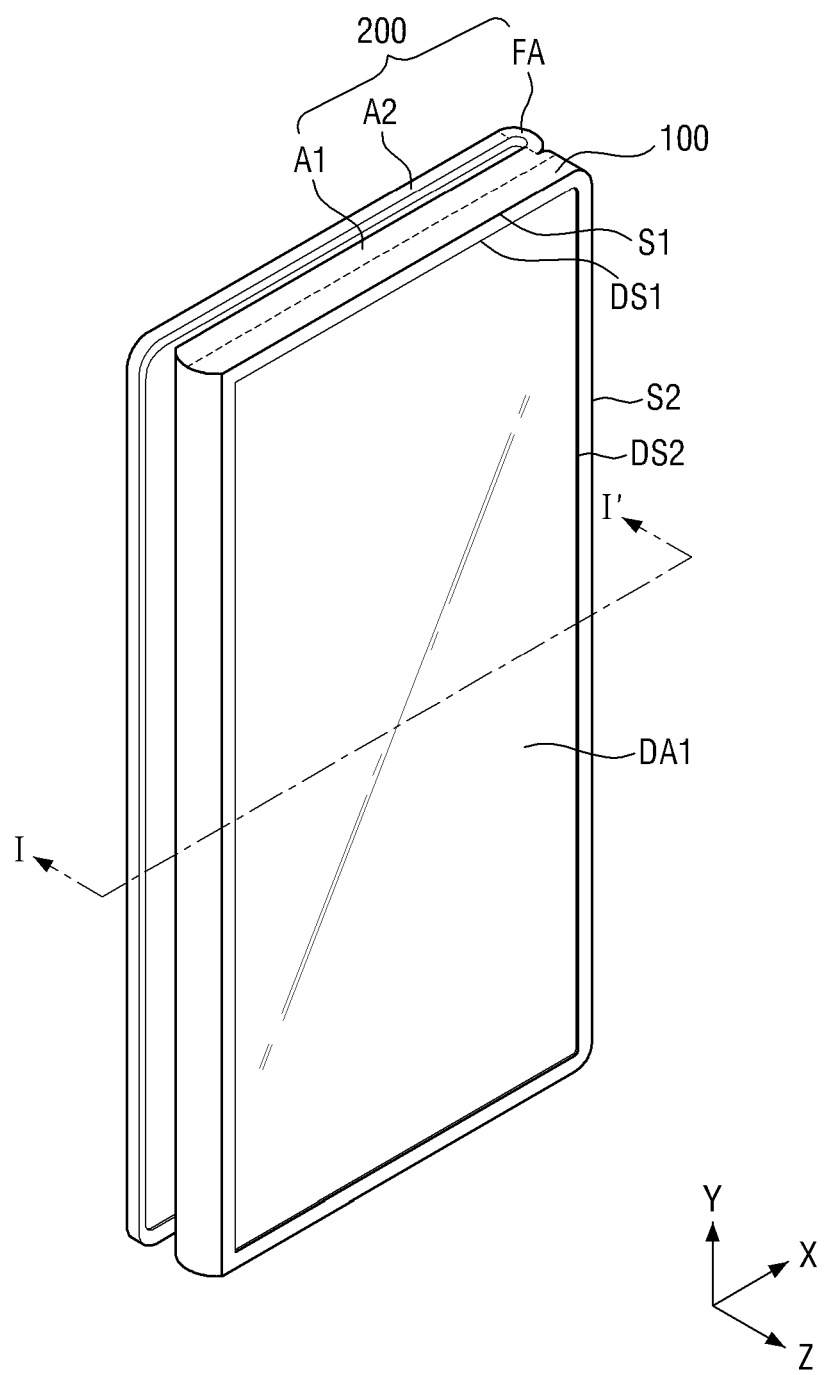
FIG. 1 is a perspective view illustrating a display device in a folded state according to an embodiment.

In the following description, for the purposes of explanation, numerous details are set forth in order to provide a thorough understanding of various example embodiments or implementations of the present disclosure. As used herein "embodiments" and "implementations" are interchangeable words that refer to non-limiting examples of devices or methods of one or more of the embodiments of the present disclosure. It is apparent, however, that various example embodiments may be practiced without these details or with one or more equivalent arrangements. In other instances, well-known or generally available structures and devices are shown in block diagram form in order to avoid unnecessarily obscuring various example embodiments. Further, various example embodiments may be different, but do not have to be exclusive. For example, example shapes, configurations, and characteristics of an example embodiment may be used or implemented in another example embodiment without departing from the present disclosure.

Unless otherwise specified, the illustrated example embodiments are to be understood as providing example features of varying detail of some ways in which the present disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the present disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, an example process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening element(s) or layer(s) may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z", "at least one selected from X, Y, and Z", and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types or kinds of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing example embodiments and is not intended to be limiting. As used herein, the singular forms, "a," "an," and "the" are intended to include the plural forms as well, unless the context clearly indicates otherwise. Moreover, the terms "comprises," "comprising," "includes," and "including," when used in this specification, specify the presence of stated features, integers, acts, steps, operations, elements, components, and/or groups thereof, but do not preclude the presence or addition of one or more other features, integers, acts, steps, operations, elements, components, and/or groups thereof. It is also noted that, as used herein, the terms "approximately", "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not intended to be limiting.

As customary in the field, some example embodiments are described and illustrated in the accompanying drawings in terms of functional blocks, units, and/or modules. Those skilled in the art will appreciate that these blocks, units, and/or modules are physically implemented by, for example, electronic (or optical) circuits, such as logic circuits, discrete components, microprocessors, hard-wired circuits, memory elements, wiring connections, and/or the like, which may be formed utilizing semiconductor-based fabrication techniques and/or other manufacturing technologies. In the case of the blocks, units, and/or modules being implemented by microprocessors or other similar hardware, they may be programmed and controlled utilizing software (e.g., microcode) to perform various suitable functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some example embodiments may be physically separated into two or more interacting and discrete blocks, units, and/or modules without departing from the scope of the present disclosure. Further, the blocks, units, and/or modules of some example embodiments may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
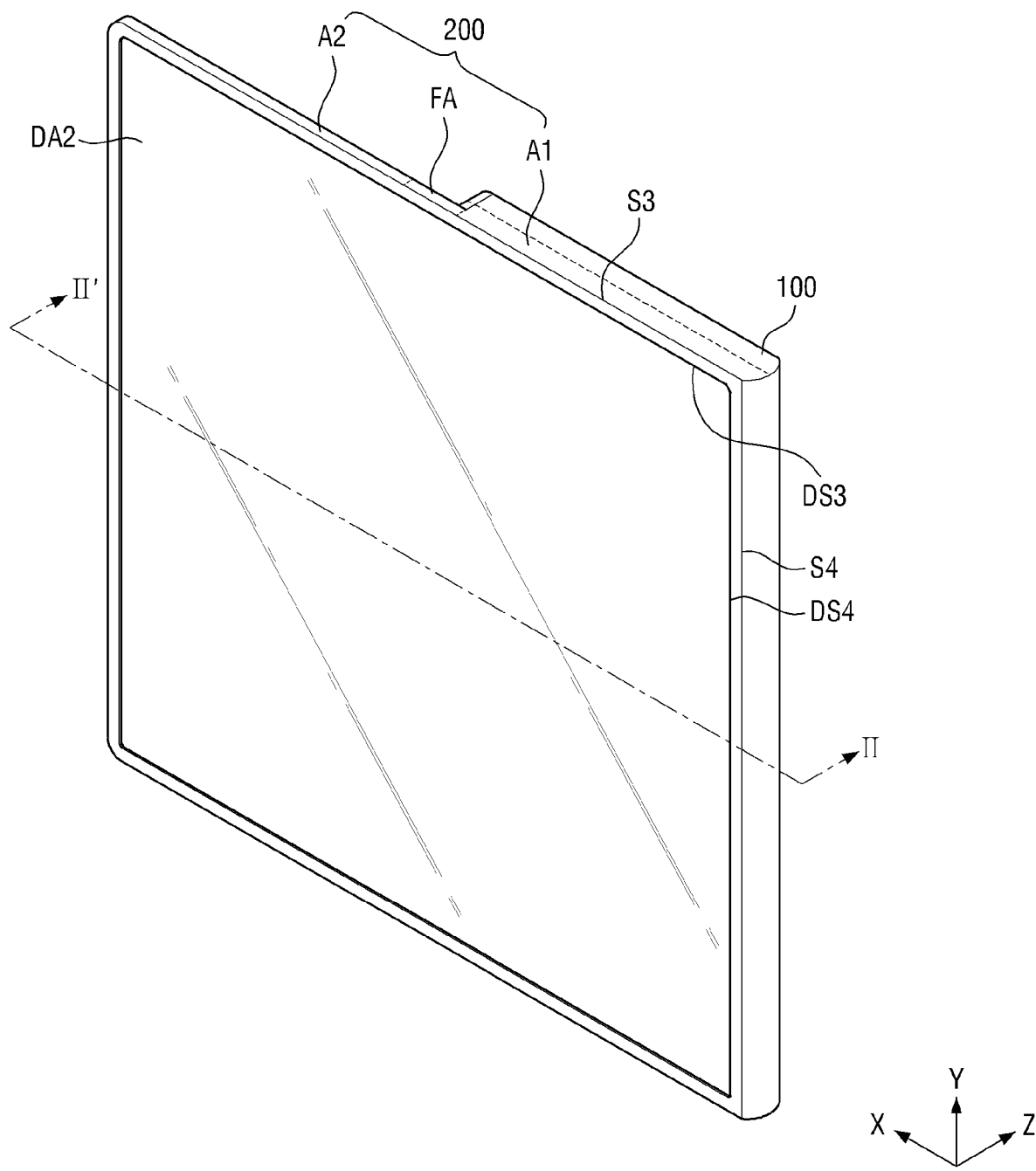
FIG. 2 is a perspective view illustrating the display device in an unfolded state according to an embodiment.

FIG. 1 is a perspective view illustrating a display device in a folded state according to an embodiment, and FIG. 2 is a perspective view illustrating the display device in an unfolded state according to an embodiment.

In the present specification, "upper portion," "top," "upper surface," and "upper end" indicate an upward direction, e.g., a Z-axis direction, and "lower portion," "bottom," "lower surface," and "lower end" indicate a downward direction, e.g., an opposite direction of the Z-axis direction. Also, "leftward," "rightward," "upward," and "downward" indicate directions when the display device is viewed from a plane. For example, "leftward" indicates an opposite direction of an X-axis direction, "rightward" indicates the X-axis direction, "upward" indicates a Y-axis direction, and "downward" indicates an opposite direction of the Y-axis direction.

Referring to FIGS. 1 and 2, the display device may include a first display unit 100 having a first display area DA1 and a second display unit 200 having a second display area DA2.

The first display unit 100 may be formed in a rectangular shape in a plan view. For example, the first display unit 100 may have a rectangular shape having first sides 51 in a first direction (X-axis direction) and second sides S2 in a second direction (Y-axis direction). The first sides 51 may each have a length shorter than that of the second side S2. A corner where any one of the first sides 51 and any one of the second sides S2 meet may be formed to be right-angled or formed to be rounded with a set or predetermined curvature. As another example, the first display unit 100 may have a polygonal shape other than the rectangular shape, a circular shape, or an elliptical shape in the plan view.

In the plan view, the first display area DA1 of the first display unit 100 may have a rectangular shape including first display sides DS1 parallel (e.g., substantially parallel) to the first sides 51 in the first direction (X-axis direction) and second display sides DS2 parallel (e.g., substantially parallel) to the second sides S2 in the second direction (Y-axis direction). For example, the first display sides DS1 may each have a length shorter than that of the second display side DS2. A corner where any one of the first display sides DS1 and any one of the second display sides DS2 meet may be formed to be right-angled or formed to be rounded with a set or predetermined curvature. The first display area DA1 may have a polygonal shape other than the rectangular shape, a circular shape, or an elliptical shape in the plan view.

The second display unit 200 may include a first area A1, a second area A2, and a folding area FA disposed between the first area A1 and the second area A2. The second display unit 200 may be folded as illustrated in FIG. 1 or unfolded as illustrated in FIG. 2 according to a state of the folding area FA. The second display unit 200 may have a rectangular shape in the plan view when it is in an unfolding state. In the plan view, the second display unit 200 may have a rectangular shape having third sides S3 in the first direction (X-axis direction) and fourth sides S4 in the second direction (Y-axis direction). For example, the third sides S3 may each have a length longer than that of the fourth side S4. In this case, a user may view a screen having long sides in the first direction (X-axis direction). As another example, the third sides S3 may each have a length shorter than that of the fourth side S4. In this case, a user may view a screen having long sides in the second direction (Y-axis direction). As still another example, the third sides S3 may each have a length substantially equal to that of the fourth side S4. In this case, a user may view a square screen. A corner where any one of the third sides S3 and any one of the fourth sides S4 meet may be formed to be right-angled or formed to be rounded with a set or predetermined curvature. The second display unit 200 may have a polygonal shape other than the rectangular shape, a circular shape, or an elliptical shape in the plan view.

In the plan view, the second display area DA2 of the second display unit 200 may have a rectangular shape including third display sides DS3 parallel (e.g., substantially parallel) to the third sides S3 in the first direction (X-axis direction) and fourth display sides DS4 parallel (e.g., substantially parallel) to the fourth sides S4 in the second direction (Y-axis direction). For example, the third display sides DS3 may each have a length longer than that of the fourth display side DS4. As another example, the third display sides DS3 may each have a length shorter than that of the fourth display side DS4. As still another example, the third display sides DS3 may each have a length substantially equal to that of the fourth display side DS4. A corner where any one of the third display sides DS3 and any one of the fourth display sides DS4 meet may be formed to be right-angled or formed to be rounded with a set or predetermined curvature. The second display area DA2 may have a polygonal shape other than the rectangular shape, a circular shape, or an elliptical shape in the plan view.

In some embodiments, the second display unit 200 may include a flexible substrate that is bendable, foldable, rollable, and/or the like such that the second display unit 200 is easily folded in the folding area FA. As another example, to supplement a folding function of the folding area FA, the second display unit 200 may include a hinge disposed at one surface of the second display unit 200.

In a state in which the second display unit 200 is folded as illustrated in FIG. 1, the second display area DA2 of (i.e., associated with) the first area A1 and the second display area DA2 of (i.e., associated with) the second area A2 may be in-folded to face each other. The second display unit 200 may be bent with a set or predetermined curvature in the folding area FA such that the second display area DA2 of the second display unit 200 may be folded. For example, the first display area DA1 of the first display unit 100 may face in the third direction (Z-axis direction), and the second display area DA2 of the second display unit 200 may also face in the third direction (Z-axis direction). In some embodiments, when the second display unit 200 is unfolded, the second display area DA2 may face in a direction opposite to the third direction (Z-axis direction). In some embodiments, when the second display unit 200 is in-folded, the second display area DA2 of the first area A1 may face in a direction opposite to the third direction (Z-axis direction), and the second display area DA2 of the second area A2 may face in the third direction (Z-axis direction).

The display device may display an image in the third direction (Z-axis direction) utilizing the first display unit 100 in the state in which the second display unit 200 is folded. The display device may display an image in the opposite direction of the third direction (Z-axis direction) utilizing the second display unit 200 in a state in which the second display unit 200 is unfolded. For example, the display device may display an image in the negative Z-axis direction utilizing the second display unit 200 in a state in which the display unit 200 is unfolded. In this case, the first display unit 100 may display an image in the third direction (Z-axis direction) or not display an image at all.

Figure 3:
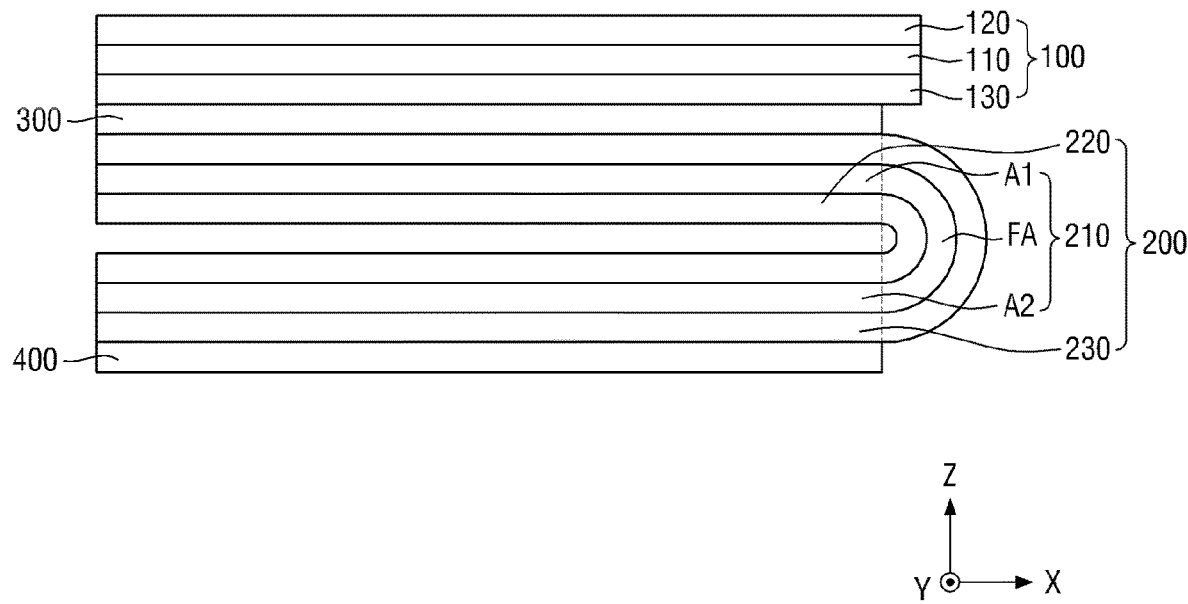
FIG. 3 is an example view of a cross-section taken along line I-I' of FIG. 1.
Figure 4:
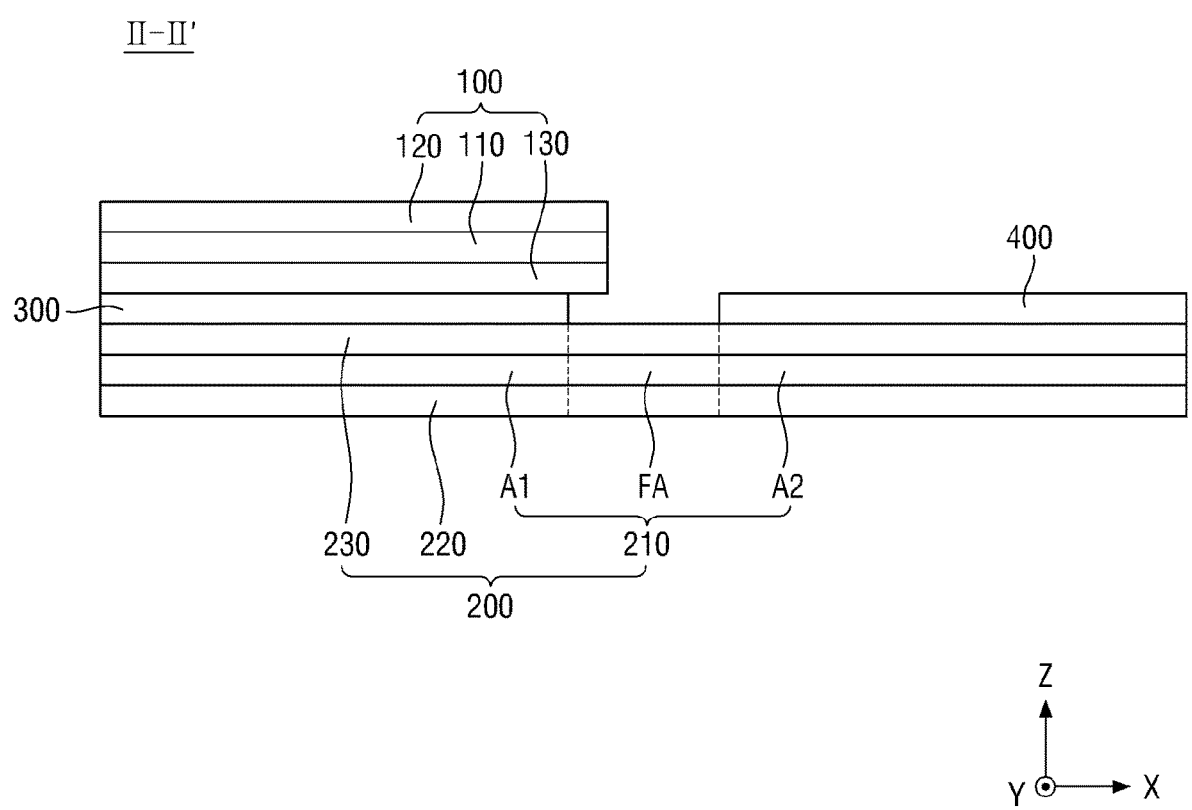
FIG. 4 is an example view of a cross-section taken along line II-II' of FIG. 2.

FIG. 3 is an example view of a cross-section taken along line I-I' of FIG. 1, and FIG. 4 is an example view of a cross-section taken along line II-II' of FIG. 2.

Referring to FIGS. 3 and 4, the display device may include the first display unit 100, the second display unit 200, a first panel lower member 300, and a second panel lower member 400.

The first display unit 100 may display an image in the third direction (Z-axis direction). The first display unit 100 may be disposed at one surface (e.g., on an upper surface) of the first panel lower member 300 and may be supported by the first panel lower member 300. The first display unit 100 may include a first display panel 110, a first cover window 120, and a first force sensor 130.

The first display panel 110 may be an organic light emitting display panel that utilizes an organic light emitting diode (OLED), a micro light emitting display panel that utilizes a micro LED, or a quantum dot light emitting display panel that includes a quantum dot LED. Hereinafter, description will be given by assuming that the first display panel 110 is an organic light emitting display panel. The first display panel 110 is disposed more adjacent to the first cover window 120 than to the first force sensor 130. For example, the first display panel 110 may be between the first force sensor 130 and the first cover window 120. In this way, image quality of the display device may be improved.

The first cover window 120 may be disposed at an upper portion (e.g., on an upper surface) of the first display panel 110. The first cover window 120 may protect the first display panel 110 by covering an upper surface of the first display panel 110. The first cover window 120 may be attached onto the first display panel 110 by an optically clear adhesive member. The first cover window 120 may correspond to a surface of the first display area DA1 and come in contact or direct contact with a user's body. For example, the first cover window 120 may be formed of at least one material selected from glass, sapphire, and plastic. The first cover window 120 may be formed to be rigid or flexible.

The first force sensor 130 may be disposed at a lower portion (e.g., on a lower surface) of the first display panel 110. The first force sensor 130 may detect a user's touch made on the first cover window 120. The first force sensor 130 may be disposed to overlap a full surface, or the entire surface, of the first display panel 110. The first force sensor 130 may be disposed to overlap a full surface, or the entire surface, of the first cover window 120. For example, the first force sensor 130 may include a plurality of touch cells that overlap the full surface, or the entire surface, of the first display panel 110 and/or the full surface, or the entire surface, of the first cover window 120. Resistance values of touch cells, which receive a force due to a touch (e.g., a user's touch), among the plurality of touch cells of the first force sensor 130 may change according to the size of the force. Therefore, the first force sensor 130 may, on the basis of positions of the touch cells whose resistance values are changed, detect a position at which the touch is made and, on the basis of an extent to which the resistance values are changed, detect the size of a touch force.

The second display unit 200 may be folded as illustrated in FIG. 3 or unfolded as illustrated in FIG. 4 according to a state of the folding area FA. In a state in which the second display unit 200 is unfolded, the second display unit 200 may display an image in the opposite direction of the third direction (Z-axis direction). For example, when the second display unit 200 is unfolded, the second display unit 200 may display an image in the negative Z-axis direction. The second display unit 200 may include a second display panel 210, a second cover window 220, and a second force sensor 230.

The second display panel 210 may be an organic light emitting display panel that utilizes an OLED, a micro light emitting display panel that utilizes a micro LED, or a quantum dot light emitting display panel that includes a quantum dot LED.

The second display panel 210 may include the first area A1, the second area A2, and the folding area FA between the first area A1 and the second area A2. For example, the second display panel 210 may include a flexible substrate that is bendable, foldable, rollable, and/or the like such that the second display panel 210 is easily folded in the folding area FA. As another example, to supplement the folding function of the folding area FA, the second display panel 210 may include a hinge disposed at one surface of the second display unit 200.

The first area A1 of the second display panel 210 may be disposed at the other surface (e.g., on a lower surface) of the first panel lower member 300 opposite to the one surface (e.g., the upper surface) of the first panel lower member 300 and may be supported by the first panel lower member 300. The first area A1 of the second display panel 210 and the first display panel 110 may face each other (e.g., may overlap each other) with the first panel lower member 300 disposed therebetween.

The second area A2 of the second display panel 210 may be connected to the first area A1 through the folding area FA. When the folding area FA of the second display panel 210 is folded as illustrated in FIG. 3, the second area A2 of the second display panel 210 may overlap the first area A1 in the third direction (Z-axis direction). When the folding area FA of the second display panel 210 is unfolded as illustrated in FIG. 4, the second area A2 of the second display panel 210 may be disposed to be coplanar (e.g., on a single flat plane) with the folding area FA and the first area A1.

The second area A2 of the second display panel 210 may be disposed at one surface (e.g., on a lower surface) of the second panel lower member 400 and may be supported by the second panel lower member 400.

The second cover window 220 may be disposed at one surface (e.g., on a lower surface) of the second display panel 210. The second cover window 220 may protect the second display panel 210 by covering the one surface of the second display panel 210. The second cover window 220 may be attached to the one surface of the second display panel 210 by an optically clear adhesive member. The second cover window 220 may correspond to a surface of the second display area DA2 and may come in contact or direct contact with a user's body. For example, the second cover window 220 may be formed of at least one selected from among material of glass, sapphire, and plastic. A portion of the second cover window 220 may overlap the folding area FA of the second display panel 210, and at least a portion of the second cover window 220 may be formed to be flexible.

The second force sensor 230 may be disposed at the other surface (e.g., on the upper surface) of the second display panel 210 opposite to the one surface thereof. The second force sensor 230 may detect a user's touch made on the second cover window 220. The second force sensor 230 may be disposed to overlap a full surface, or the entire surface, of the second display panel 210. The second force sensor 230 may be disposed to overlap a full surface, or the entire surface, of the second cover window 220. For example, the second force sensor 230 may include a plurality of touch cells that overlap the full surface, or the entire surface, of the second display panel 210 and/or the full surface, or the entire surface, of the second cover window 220. Resistance values of touch cells, which receive a force due to a touch, among the plurality of touch cells of the second force sensor 230 may change according to the size of the force. Therefore, the second force sensor 230 may, on the basis of positions of the touch cells whose resistance values are changed, detect a position at which the touch is made and, on the basis of an extent to which the resistance values are changed, detect the size of a touch force.

The first panel lower member 300 may be disposed between the first display unit 100 and the first area A1 of the second display panel 210. The one surface of the first panel lower member 300 may support the first display unit 100, and the other surface of the first panel lower member 300 may support the first area A1 of the second display panel 210. For example, the one surface of the first panel lower member 300 may directly support the first force sensor 130 of the first display unit 100. The one surface of the first panel lower member 300 may indirectly support the first display panel 110 and the first cover window 120. The other surface of the first panel lower member 300 may directly support a portion of the second force sensor 230 overlapping the first area A1 of the second display panel 210. The other surface of the first panel lower member 300 may indirectly support the first area A1 and a portion of the second cover window 220 overlapping the first area A1.

The first panel lower member 300 may include a buffer member and/or a heat dissipation member. The buffer member of the first panel lower member 300 may absorb an external impact and prevent or reduce damage to the first display unit 100 and to a portion of the second display unit 200 that overlaps the first area A1. For example, the buffer member of the first panel lower member 300 may be formed of a single layer or multiple layers including (e.g., made of) polymer resin such as polyurethane, polycarbonate, polypropylene, and/or polyethylene. As another example, the first panel lower member 300 may include (e.g., be made of) an elastic material such as rubber, a urethane-based material, and/or a sponge formed by foaming an acrylic-based material.

For example, the heat dissipation member of the first panel lower member 300 may include (e.g., be) graphite, carbon nanotubes, and/or the like and block electromagnetic waves. As another example, the heat dissipation member of the first panel lower member 300 may be formed of a metal thin film including (e.g., made of) copper (Cu), nickel (Ni), ferrite, silver (Ag), and/or the like having excellent heat conductivity and may dissipate heat generated from the first display unit 100 and/or the second display unit 200.

The second panel lower member 400 may support the second display unit 200 (e.g., at least a portion of the second display unit 200, such as the portion of the second display unit 200 that overlaps the second area A2). The second panel lower member 400 may directly support a portion of the second force sensor 230 overlapping the second area A2 and may indirectly support the second area A2 and a portion of the second cover window 220 overlapping the second area A2.

When the second display unit 200 is folded as illustrated in FIG. 3, the second panel lower member 400 may overlap the first panel lower member 300 in the third direction (Z-axis direction). When the second display unit 200 is unfolded as illustrated in FIG. 4, the second panel lower member 400 may be disposed to be coplanar (e.g., on a single flat plane) with the first panel lower member 300. In FIG. 4, the first panel lower member 300 and the second panel lower member 400 may be spaced apart from each other by a length of the folding area FA (e.g., by a distance between the first area A1 and the second area A2).

The second panel lower member 400 may include a buffer member and/or a heat dissipation member. The buffer member of the second panel lower member 400 may absorb an external impact and prevent or reduce damage to a portion of the second display unit 200 that overlaps the second area A2. For example, the buffer member of the second panel lower member 400 may be formed of a single layer or multiple layers including (e.g., made of) polymer resin such as polyurethane, polycarbonate, polypropylene, and/or polyethylene. As another example, the second panel lower member 400 may include (e.g., be made of) an elastic material such as rubber, a urethane-based material, and/or a sponge formed by foaming an acrylic-based material.

For example, the heat dissipation member of the second panel lower member 400 may include (e.g., be) graphite, carbon nanotubes, and/or the like and may block electromagnetic waves. As another example, the heat dissipation member of the second panel lower member 400 may be formed of a metal thin film including (e.g., made of) Cu, Ni, ferrite, Ag, and/or the like having excellent heat conductivity and may dissipate heat generated from the second display unit 200.

Figure 5:
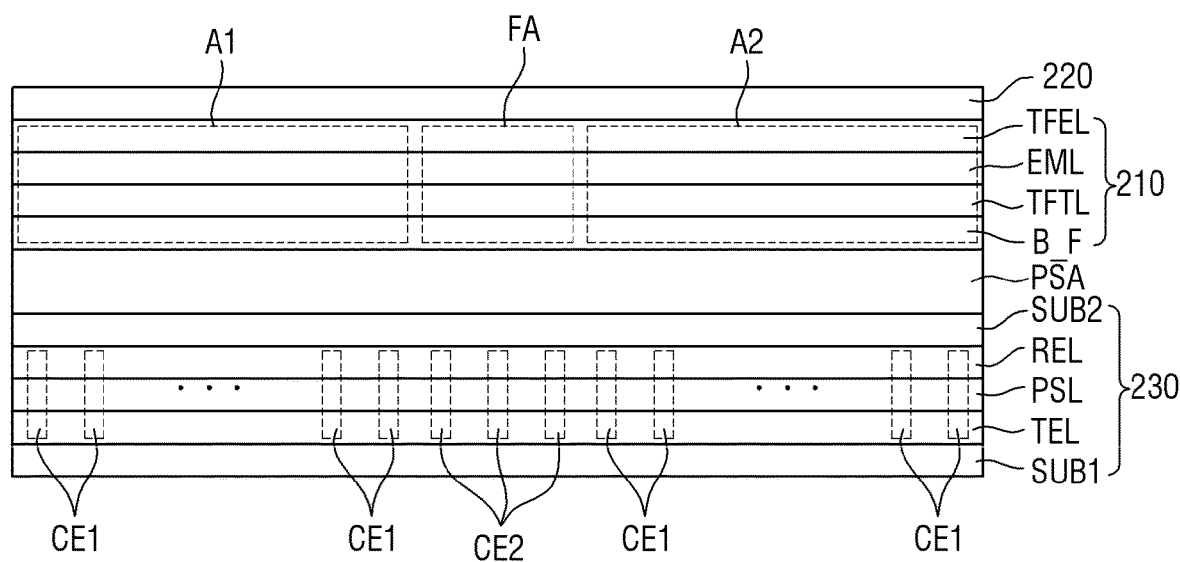
FIG. 5 is a cross-sectional view of a second display unit of the display device according to an embodiment.

FIG. 5 is a cross-sectional view of a second display unit of the display device according to an embodiment. Here, a cross-sectional view of the second display unit 200 in an unfolding state may include substantially the same configuration as a cross-sectional view of the first display unit 100. Cross-sectional configurations of the second display panel 210, the second cover window 220, and the second force sensor 230 may correspond to (e.g., may include substantially the same configuration as) cross-sectional configurations of the first display panel 110, the first cover window 120, and the first force sensor 130, respectively. Hereinafter, the cross-sectional configuration of the second display unit 200 will be described in more detail, and descriptions of the cross-sectional configuration of the first display unit 100 will be omitted.

Referring to FIG. 5, the second display panel 210 may include a base film B_F, a thin film transistor layer TFTL, a light emitting element layer EML, and a thin film encapsulation layer TFEL.

The base film B_F may be a base substrate and formed of an insulating material such as polymer resin. For example, the base film B_F may be formed of polyether sulfone (PES), polyacrylate (PAC), polyarylate (PAR), polyether imide (PEI), polyethylene naphthalate (PEN), polyethylene terephthalate (PET), polyphenylene sulfide (PPS), polyimide (PI), polycarbonate (PC), cellulose triacetate (CTA), cellulose acetate propionate (CAP), or a combination thereof. The base film B_F may be a flexible substrate that is bendable, foldable, rollable, and/or the like.

The thin film transistor layer TFTL may be disposed at an upper portion (e.g., on an upper surface) of the base film B_F. The thin film transistor layer TFTL may include one or more thin film transistors each configured to drive one of a plurality of subpixels. The one or more thin film transistors of the subpixels may include a semiconductor layer, a gate electrode, a drain electrode, and a source electrode. In some embodiments, the thin film transistor layer TFTL may further include scan lines, data lines, power lines, and scan control lines, which are connected to the one or more thin film transistors of the subpixels, and may further include routing lines which connect the data lines to pads.

The light emitting element layer EML may be disposed at an upper portion (e.g., on an upper surface) of the thin film transistor layer TFTL. The light emitting element layer EML may include a light emitting element connected to the one or more thin film transistors of the thin film transistor layer TFTL. The light emitting element may include a first electrode, a light emitting layer, and a second electrode. For example, the light emitting layer may be an organic light emitting layer formed of an organic material, but the present disclosure is not limited thereto. In a case in which the light emitting layer corresponds to an organic light emitting layer, when the thin film transistor of the thin film transistor layer TFTL applies a set or predetermined voltage to the first electrode of the light emitting element, and the second electrode of the light emitting element receives a common voltage or a cathode voltage, holes and electrons may move to the organic light emitting layer through a hole transport layer and an electron transport layer, respectively, and the holes and the electrons may combine with each other in the organic light emitting layer such that light is emitted.

The light emitting element layer EML may include a pixel defining film which defines the plurality of subpixels. The first electrode and the light emitting layer of the light emitting element may be spaced apart and insulated from an adjacent first electrode and an adjacent light emitting layer of an adjacent light emitting element by the pixel defining film. For example, first electrodes and light emitting layers of adjacent subpixels may be spaced apart and insulated from each other by the pixel defining film.

The thin film encapsulation layer TFEL may be disposed at an upper portion (e.g., on an upper surface) of the light emitting element layer EML and may cover the thin film transistor layer TFTL and the light emitting element layer EML. The thin film encapsulation layer TFEL may prevent or reduce penetration and/or permeation of oxygen and/or moisture into the light emitting element layer EML. For example, the thin film encapsulation layer TFEL may include (e.g., be) at least one inorganic film. The thin film encapsulation layer TFEL may include (e.g., be) an inorganic film such as a silicon nitride layer, a silicon oxynitride layer, a silicon oxide layer, a titanium oxide layer, and/or an aluminum oxide layer, but the present disclosure is not limited thereto.

The thin film encapsulation layer TFEL may protect the light emitting element layer EML from foreign substances such as dust. For example, the light emitting element layer EML may prevent, or reduce the occurrence of, foreign substances, such as dust, from contacting or penetrating into the thin film encapsulation layer TFEL. For example, the thin film encapsulation layer TFEL may include (e.g., be) at least one organic film. The thin film encapsulation layer TFEL may include (e.g., be) an organic film such as acrylic resin, epoxy resin, phenolic resin, polyamide resin, and/or polyimide resin, but the present disclosure is not limited thereto.

The second display panel 210 may include the first area A1, the second area A2, and the folding area FA between the first area A1 and the second area A2.

The second cover window 220 may be disposed at an upper portion (e.g., on an upper surface) of the thin film encapsulation layer TFEL. The second cover window 220 may protect the second display panel 210 by covering an upper surface of the thin film encapsulation layer TFEL.

The second force sensor 230 may be disposed at a lower portion (e.g., on a lower surface) of the base film B_F. The second force sensor 230 may include a first substrate SUB1, a driving electrode layer TEL, a force sensing layer PSL, a sensing electrode layer REL, and a second substrate SUB2.

The first substrate SUB1 and the second substrate SUB2 may face each other (e.g., may overlap each other) with the driving electrode layer TEL, the force sensing layer PSL, and the sensing electrode layer REL disposed therebetween. In some embodiments, the first substrate SUB1 and the second substrate SUB2 may each be formed of PES, PAC, PAR, PEI, PEN, PET, PPS, PI, PC, CTA, CAP, or a combination thereof.

The driving electrode layer TEL may be disposed on the first substrate SUB1. The driving electrode layer TEL may include a plurality of driving electrodes. The plurality of driving electrodes may each be connected to a touch driver through a driving line and may receive a touch driving voltage from the touch driver.

The sensing electrode layer REL may be disposed on (e.g., on a lower surface of) the second substrate SUB2. The sensing electrode layer REL may face the driving electrode layer TEL with the force sensing layer PSL disposed therebetween. The sensing electrode layer REL may include a plurality of sensing electrodes. The plurality of sensing electrodes may each be connected to the touch driver through a sensing line and may supply a touch input signal to the touch driver.

The resistance values of the plurality of touch cells, which include the plurality of driving electrodes of the driving electrode layer TEL, the force sensing layer PSL, and the plurality of sensing electrodes of the sensing electrode layer REL, may change according to a force applied to the plurality of touch cells. For example, the higher the force applied to the plurality of touch cells, the more the resistance values of the touch cells are decreased. When the force applied to the plurality of touch cells is relatively low, a change in the resistance values of the touch cells may be insignificant. The touch driver may sense a change in a current value or a voltage value of a touch input signal according to the change in the resistance values of the plurality of touch cells connected to the sensing line. Therefore, because the touch driver may sense a force exerted by a user's finger, the second force sensor 230 may be utilized as an input device that senses a touch input of the user.

The force sensing layer PSL may be disposed between the driving electrode layer TEL and the sensing electrode layer REL. The force sensing layer PSL may form the plurality of touch cells by overlapping the plurality of driving electrodes and the plurality of sensing electrodes. For example, in some embodiments, each of the touch cells may include a portion of each of the force sensing layer PSL, the driving electrodes, and the sensing electrodes that overlap each other.

The force sensing layer PSL may include (e.g., be) polymer resin containing a force sensitive material. The force sensitive material may be fine metal particles (or metal nanoparticles) including (e.g., made of) Ni, aluminum (Al), titanium (Ti), tin (Sn), Cu, and/or the like. For example, the force sensing layer PSL may be a quantum tunneling composite (QTC).

The second force sensor 230 may include a plurality of touch cells CE formed in every area where the plurality of driving electrodes of the driving electrode layer TEL, the force sensing layer PSL, and the plurality of sensing electrodes of the sensing electrode layer REL overlap one another. The plurality of touch cells CE may each sense a force at the corresponding position independently. The plurality of touch cells CE may be disposed to be continuous or disposed to be spaced apart from each other at set or predetermined intervals.

The second force sensor 230 may include a plurality of first touch cells CE1 and a plurality of second touch cells CE2. The plurality of first touch cells CE1 may overlap the first area A1 or the second area A2 of the second display panel 210. The plurality of first touch cells CE1 may sense a force in the first area A1 or the second area A2 of the second display panel 210. Because the first area A1 or the second area A2 of the second display panel 210 is neither folded nor unfolded (e.g., is not configured to be foldable), a base force of the plurality of first touch cells CE1 may not be changed due to folding of the second display panel 210. In some embodiments, the base force of the first touch cells CE1 may, for example, refer to the force that is present in the first touch cells CE1 when there is no external force applied (e.g., by a user). Therefore, an afterimage by force due to the folding of the second display panel 210 may not occur in the plurality of first touch cells CE1.

The plurality of second touch cells CE2 may overlap the folding area FA of the second display panel 210. The plurality of second touch cells CE2 may sense a force in the folding area FA of the second display panel 210. When the folding area FA of the second display panel 210 is folded, the intensity of a base force of the plurality of second touch cells CE2 may be increased. Here, the base force may correspond to a force applied to or remaining in the plurality of second touch cells CE2 due to structural characteristics. In some embodiments, the base force of the second touch cells CE2 may, for example, refer to the force that is present in the second touch cells CE2 when there is no external force applied (e.g., by a user). For example, when the plurality of second touch cells CE2 of the second force sensor 230 are folded together with the folding area FA of the second display panel 210, the base force of the plurality of second touch cells CE2 may increase due to structural characteristics of folding. When the folding area FA of the second display panel 210 is changed from a folding state to an unfolding state, the base force of the plurality of second touch cells CE2 may remain temporarily (e.g., may temporarily remain higher than the base force of the first touch cells CE1). For example, when the folding area FA of the second display panel 210 is changed from the unfolding state to the folding state, the intensity of the base force of the plurality of second touch cells CE2 may increase, and when the folding area FA of the second display panel 210 is changed back to the unfolding state from the folding state, the base force of the plurality of second touch cells CE2 may temporarily remain at the increased intensity and may gradually return to its original intensity (i.e., the intensity of the base force of the second touch cells CE2 before the folding area FA of the second display panel 210 changed from the unfolding state to the folding state) over a period of time to. The second force sensor 230 may control a threshold voltage of the plurality of second touch cells CE2 on the basis of the intensity of the base force of the plurality of second touch cells CE2 and maintain the size of a reference force thereof constant (e.g., substantially constant). Here, the reference force may correspond to a difference between the intensity of the base force of the plurality of second touch cells CE2 and the magnitude (in force intensity) of the threshold voltage of the plurality of second touch cells CE2. By maintaining the size of the reference force constant (e.g., substantially constant), the second force sensor 230 may accurately sense the size of touch force exerted on the plurality of second touch cells CE2. A configuration for maintaining the size of the reference force will be described in more detail below with reference to FIGS. 10 to 13.

The second display unit 200 may further include an adhesive layer PSA which bonds the second display panel 210 and the second force sensor 230 to each other. The adhesive layer PSA may be disposed between a lower portion (e.g., a lower surface) of the base film B_F and an upper portion (e.g., an upper surface) of the second substrate SUB2. For example, the adhesive layer PSA may be an optically clear adhesive (OCA) film or an optically clear resin (OCR).

Figure 6:
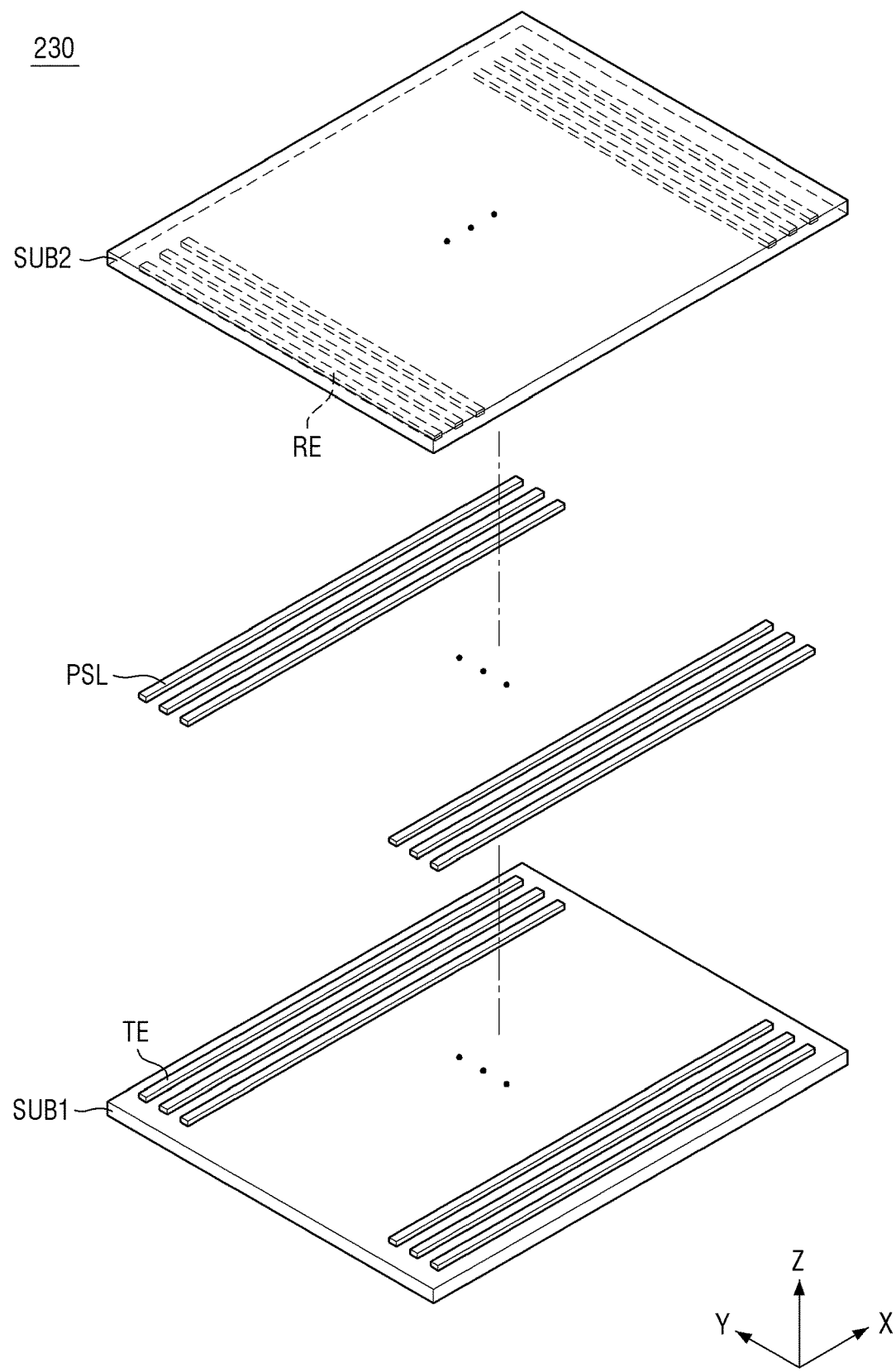
FIG. 6 is an exploded perspective view of a second force sensor of the display device according to an embodiment.

FIG. 6 is an exploded perspective view of a second force sensor of the display device according to an embodiment. Here, a configuration of the second force sensor 230 may be substantially the same as a configuration of the first force sensor 130. Hereinafter, the configuration of the second force sensor 230 will be described in more detail, and descriptions of the configuration of the first force sensor 130 will be omitted.

Referring to FIG. 6, the second force sensor 230 may include a first substrate SUB1, a plurality of driving electrodes TE, a force sensing layer PSL, a plurality of sensing electrodes RE, and a second substrate SUB2.

The plurality of driving electrodes TE may be disposed on the first substrate SUB1. The plurality of driving electrodes TE may each extend in the first direction (X-axis direction) and be spaced apart from each other in the second direction (Y-axis direction) perpendicular to the first direction (X-axis direction). The plurality of driving electrodes TE may each be connected to a touch driver through a driving line and may receive a touch driving voltage from the touch driver. For example, the plurality of driving electrodes TE may include (e.g., be) a conductive material such as Ag and/or Cu. The plurality of driving electrodes TE may be formed on the first substrate SUB1 by screen printing, but the present disclosure is not limited thereto.

The force sensing layer PSL may be formed on the plurality of driving electrodes TE. The force sensing layer PSL may be patterned according to the arrangement of the plurality of driving electrodes TE. A plurality of patterns of the force sensing layer PSL may extend in the first direction (X-axis direction) and be spaced apart from each other in the second direction (Y-axis direction) perpendicular to the first direction (X-axis direction). Therefore, the plurality of patterns of the force sensing layer PSL may cross or intersect the plurality of sensing electrodes RE.

The force sensing layer PSL may be disposed between the plurality of driving electrodes TE and the plurality of sensing electrodes RE. The force sensing layer PSL may form the plurality of touch cells CE by overlapping the plurality of driving electrodes TE and the plurality of sensing electrodes RE.

The plurality of touch cells CE may each correspond to an area where the plurality of driving electrodes TE, the force sensing layer PSL, and the plurality of sensing electrodes RE overlap one another. Resistance values of the plurality of touch cells CE may change according to a force applied to the plurality of touch cells CE. For example, the higher the force applied to the plurality of touch cells CE, the more the resistance values of the touch cells is decreased. When the force applied to the plurality of touch cells CE is relatively low, a change in the resistance values of the touch cells may be insignificant. The touch driver may sense a change in a current value or a voltage value of a touch input signal according to the change in the resistance values of the plurality of touch cells CE connected to a sensing line. Therefore, because the touch driver may sense a force exerted by a user's finger, the second force sensor 230 may be utilized as an input device that senses a touch input of the user.

The force sensing layer PSL may include (e.g., be) polymer resin containing a force sensitive material. The force sensitive material may be fine metal particles (or metal nanoparticles) including (e.g., made of) Ni, Al, Ti, Sn, Cu, and/or the like. For example, the force sensing layer PSL may be a QTC.

The plurality of sensing electrodes RE may be disposed on the second substrate SUB2. The plurality of sensing electrodes RE may each extend in the second direction (Y-axis direction) and be spaced apart from each other in the first direction (X-axis direction). The plurality of sensing electrodes RE may each cross or intersect the plurality of driving electrodes TE. The second substrate SUB2 on which the plurality of sensing electrodes RE are formed may be bonded to the first substrate SUB1 on which the plurality of driving electrodes TE and the force sensing layer PSL are formed.

The first substrate SUB1 and the second substrate SUB2 may be bonded by an adhesive member. The adhesive member may fill a gap between the first substrate SUB1 and the second substrate SUB2. Between the first substrate SUB1 and the second substrate SUB2, the adhesive member may cover an area in which the plurality of touch cells are not formed. The adhesive member may insulate each of the plurality of driving electrodes TE from each of the plurality of sensing electrodes RE and prevent, or reduce the occurrence of, the plurality of driving electrodes TE and the plurality of sensing electrodes RE from being oxidized due to exposure to the outside. Even when the second force sensor 230 receives a force from the outside, the adhesive member may prevent or reduce direct contact between the plurality of driving electrodes TE and the plurality of sensing electrodes RE.

Figure 7:
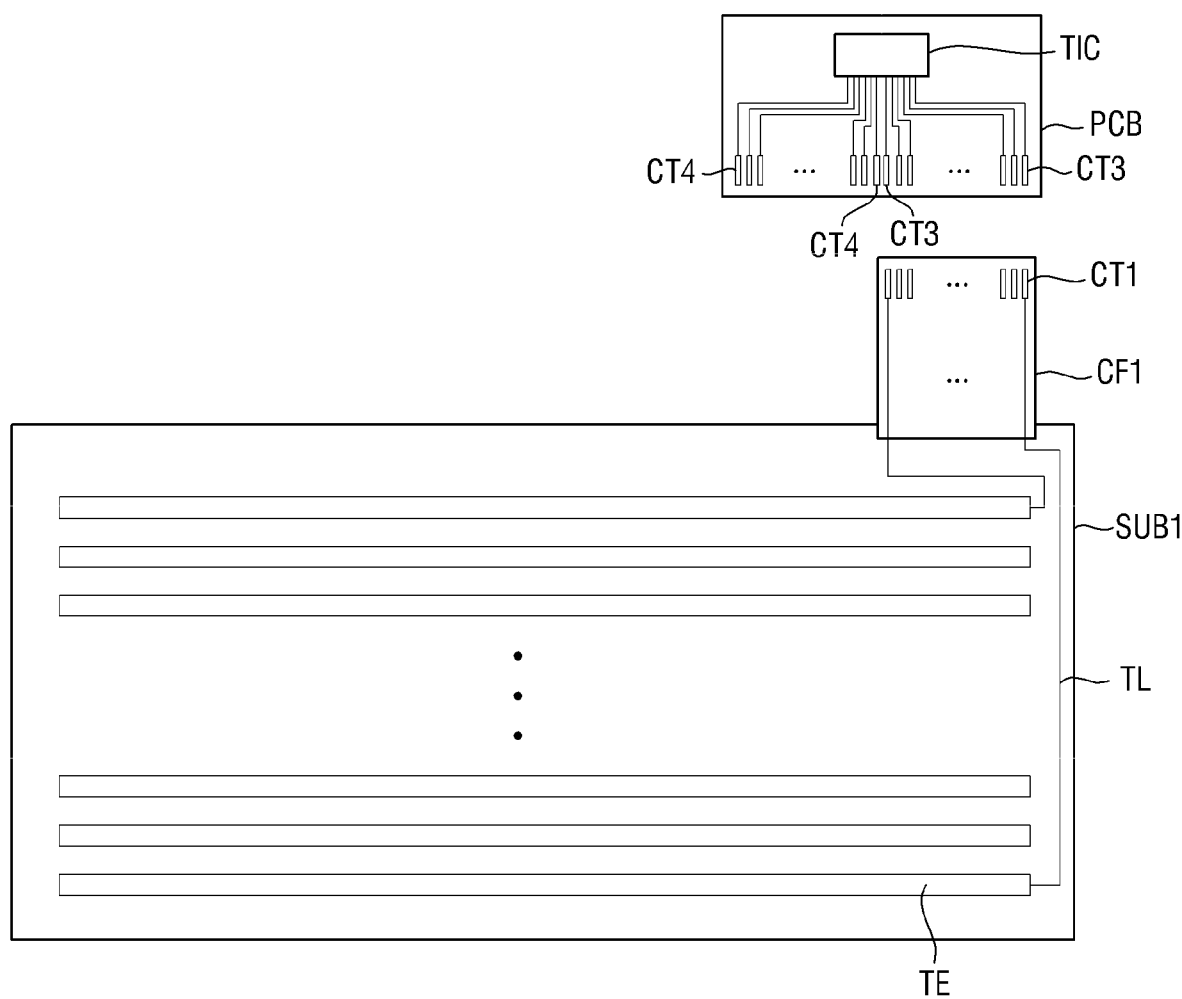
FIG. 7 is a plan view illustrating a first substrate and a printed circuit board of the display device according to an embodiment.
Figure 8:
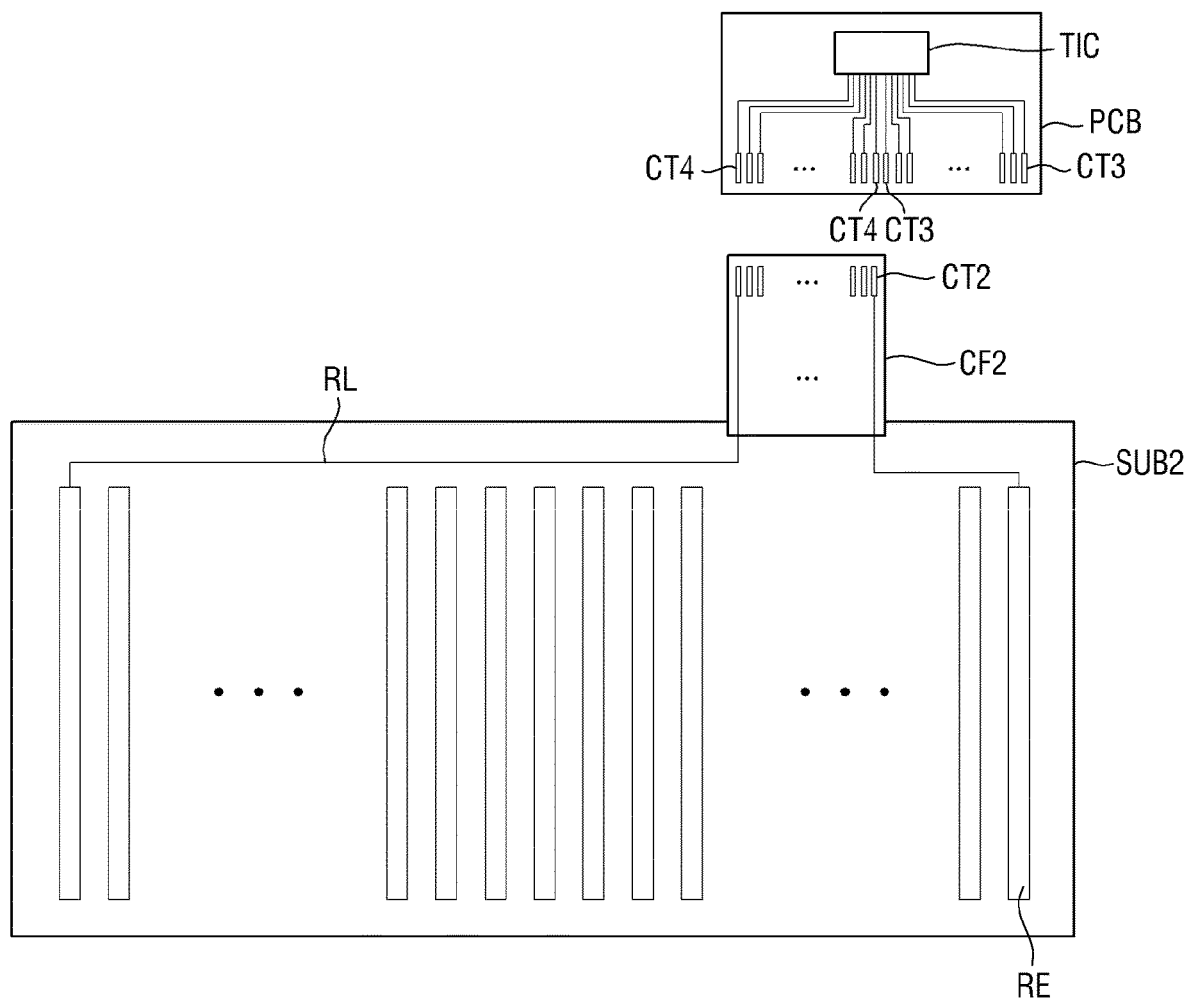
FIG. 8 is a plan view illustrating a second substrate and the printed circuit board of the display device according to an embodiment.
Figure 9:
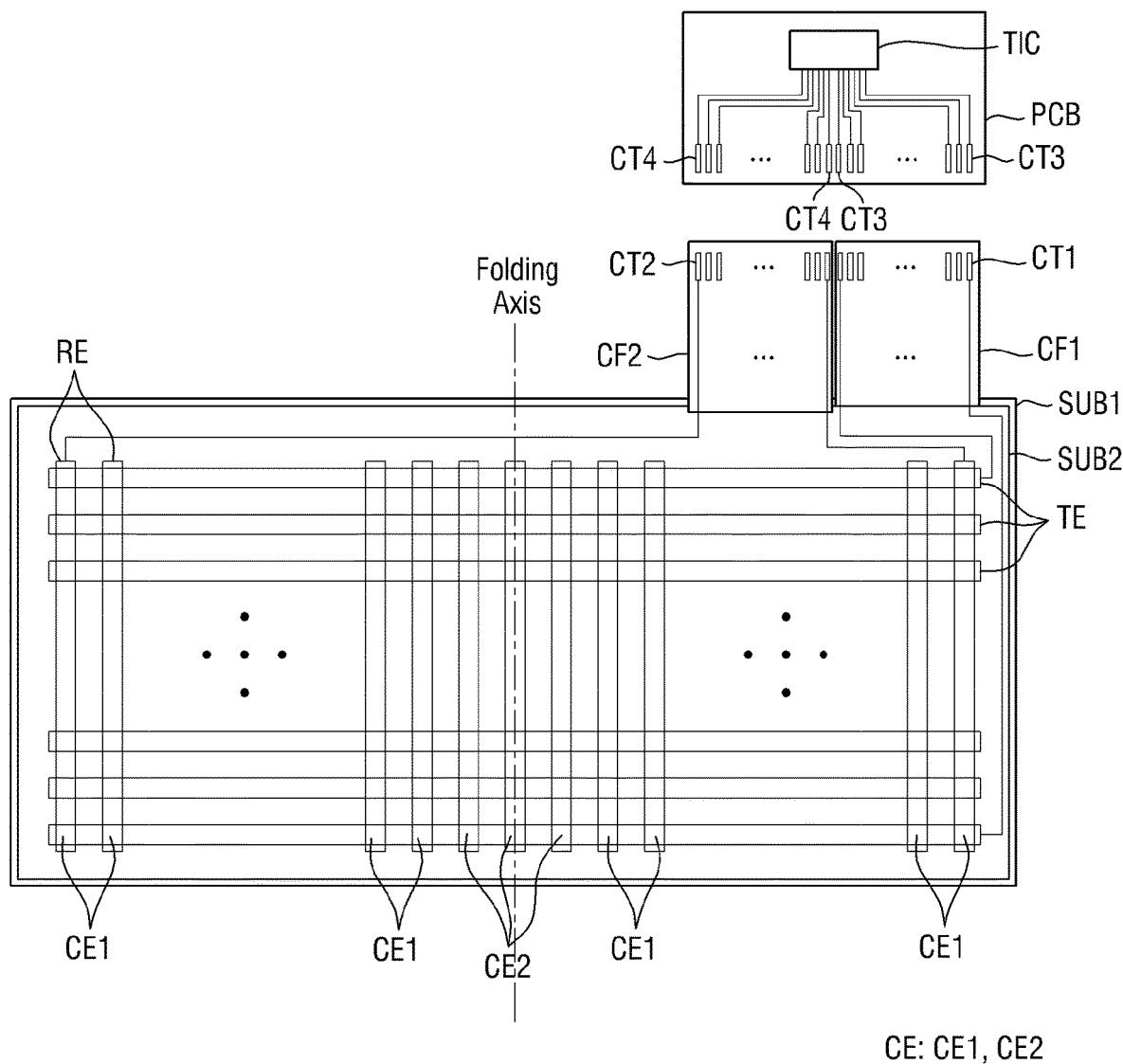
FIG. 9 is a plan view illustrating a state in which the first substrate and the second substrate of the display device are bonded to each other according to an embodiment.

FIG. 7 is a plan view illustrating a first substrate and a printed circuit board of the display device according to an embodiment, FIG. 8 is a plan view illustrating a second substrate and the printed circuit board of the display device according to an embodiment, and FIG. 9 is a plan view illustrating a state in which the first substrate and the second substrate of the display device are bonded to each other according to an embodiment.

Referring to FIGS. 7 to 9, the second force sensor 230 may further include a touch driver TIC which drives the second force sensor 230 and a printed circuit board PCB on which the touch driver TIC is mounted.

The touch driver TIC may be disposed on the printed circuit board PCB and measure a change in resistance of the plurality of touch cells CE. The plurality of touch cells CE may be formed in every area where the plurality of driving electrodes TE, the force sensing layer PSL, and the plurality of sensing electrodes RE overlap one another. For example, the plurality of touch cells CE may be spaced apart from each other in the second direction (Y-axis direction) according to intervals at which the plurality of driving electrodes TE are arranged and may be spaced apart from each other in the first direction (X-axis direction) according to intervals at which the plurality of sensing electrodes RE are arranged.

On the basis of the change in the resistance of the plurality of touch cells CE, the touch driver TIC may detect a position at which a user's touch is made and the size of a touch force. Here, the user's touch refers to a case in which an object such as a user's finger, a pen, or the like comes in contact or direct contact with a surface of the second display unit 200. Then, by receiving sensing data according to a user's touch input and removing noise, the touch driver TIC may precisely detect the user's touch input.

The printed circuit board PCB may be connected to the first substrate SUB1 through a first circuit film CF1 and connected to the second substrate SUB2 through a second circuit film CF2. A third connection terminal CT3 of the printed circuit board PCB may be connected to a first connection terminal CT1 of the first circuit film CF1, and a fourth connection terminal CT4 of the printed circuit board PCB may be connected to a second connection terminal CT2 of the second circuit film CF2. The third connection terminal CT3 may be connected to the first connection terminal CT1 through any suitable mechanisms, for example, by connection wires. The fourth connection terminal CT4 may be connected to the second connection terminal CT2 through any suitable mechanisms, for example, by connection wires. For example, the printed circuit board PCB may be a flexible printed circuit board (FPCB), a printed circuit board PCB, or a flexible film such as a chip-on-film (COF). In some embodiments, each of the first connection terminal CT1, second connection terminal CT2, third connection terminal CT3, and fourth connection terminal CT4 may be provided as a plurality of first connection terminals CT1, second connection terminals CT2, third connection terminals CT3, and fourth connection terminals CT4, respectively.

The touch driver TIC may be connected to the third connection terminal CT3 and/or the fourth connection terminal CT4 of the printed circuit board PCB through lead lines of the printed circuit board PCB.

In FIG. 7, the touch driver TIC may be connected to the third connection terminal CT3 of the printed circuit board PCB through the lead lines, and the first connection terminal CT1 of the first circuit film CF1 may be connected to the plurality of driving electrodes TE on the first substrate SUB1 through a driving line TL. Therefore, the touch driver TIC may be electrically connected to the plurality of driving electrodes TE through the lead lines, the third connection terminal CT3, the first connection terminal CT1, and the driving line TL. For example, one end of each of the plurality of driving electrodes TE may be connected to the driving line TL at the left or right side of the first substrate SUB1. The plurality of driving electrodes TE may extend to be parallel (e.g., substantially parallel) in the first direction (X-axis direction). In some embodiments, the driving line TL may be provided as a plurality of driving lines TL.

In FIG. 8, the touch driver TIC may be connected to the fourth connection terminal CT4 of the printed circuit board PCB through the lead lines, and the second connection terminal CT2 of the second circuit film CF2 may be connected to the plurality of sensing electrodes RE on the second substrate SUB2 through a sensing line RL. Therefore, the touch driver TIC may be electrically connected to the plurality of sensing electrodes RE through the lead lines, the fourth connection terminal CT4, the second connection terminal CT2, and the sensing line RL. For example, one end of each of the plurality of sensing electrodes RE may be connected to the sensing line RL at the upper side of the second substrate SUB2. The plurality of sensing electrodes RE may extend to be parallel (e.g., substantially parallel) in the opposite direction of the second direction (Y-axis direction). In some embodiments, the sensing line RL may be provided as a plurality of sensing lines RL.

In FIG. 9, the second force sensor 230 may include a plurality of first touch cells CE1 and a plurality of second touch cells CE2. The plurality of first touch cells CE1 may overlap the first area A1 and/or the second area A2 of the second display panel 210. The plurality of first touch cells CE1 may sense a force in the first area A1 and/or the second area A2 of the second display panel 210.

The plurality of second touch cells CE2 may overlap the folding area FA of the second display panel 210. The plurality of second touch cells CE2 may sense a force in the folding area FA of the second display panel 210.

When the second display panel 210 is folded along a folding axis extending in the Y-axis direction, the second force sensor 230 may also be folded along the folding axis extending in the Y-axis direction. The folding area FA of the second display panel 210 may be determined according to the folding axis, and the plurality of second touch cells CE2 may be arranged along the folding axis. For example, the plurality of second touch cells CE2 may be arranged along three columns, but the present disclosure is not limited thereto. When the folding area FA of the second display panel 210 becomes larger, the number of the plurality of second touch cells CE2 may increase. For example, when the set or predetermined curvature of the folding area FA in a folding state increases, the folding area FA may increase, and the number of the plurality of second touch cells CE2 may increase.

The driving line TL may be formed on the first substrate SUB1 and connect the plurality of driving electrodes TE to the first connection terminal CT1 of the first circuit film CF1, and the sensing line RL may be formed on the second substrate SUB2 and connect the plurality of sensing electrodes RE to the second connection terminal CT2 of the second circuit film CF2. The driving line TL and the sensing line RL may be insulated from each other by an adhesive member disposed between the first substrate SUB1 and the second substrate SUB2.

Figure 10:
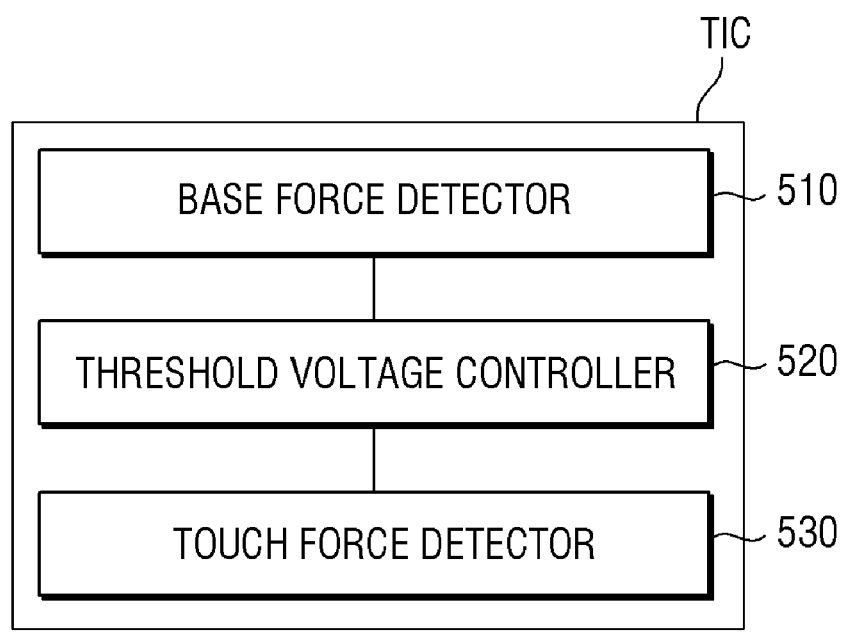
FIG. 10 is a view illustrating a touch driver of the display device according to an embodiment.
Figure 11:
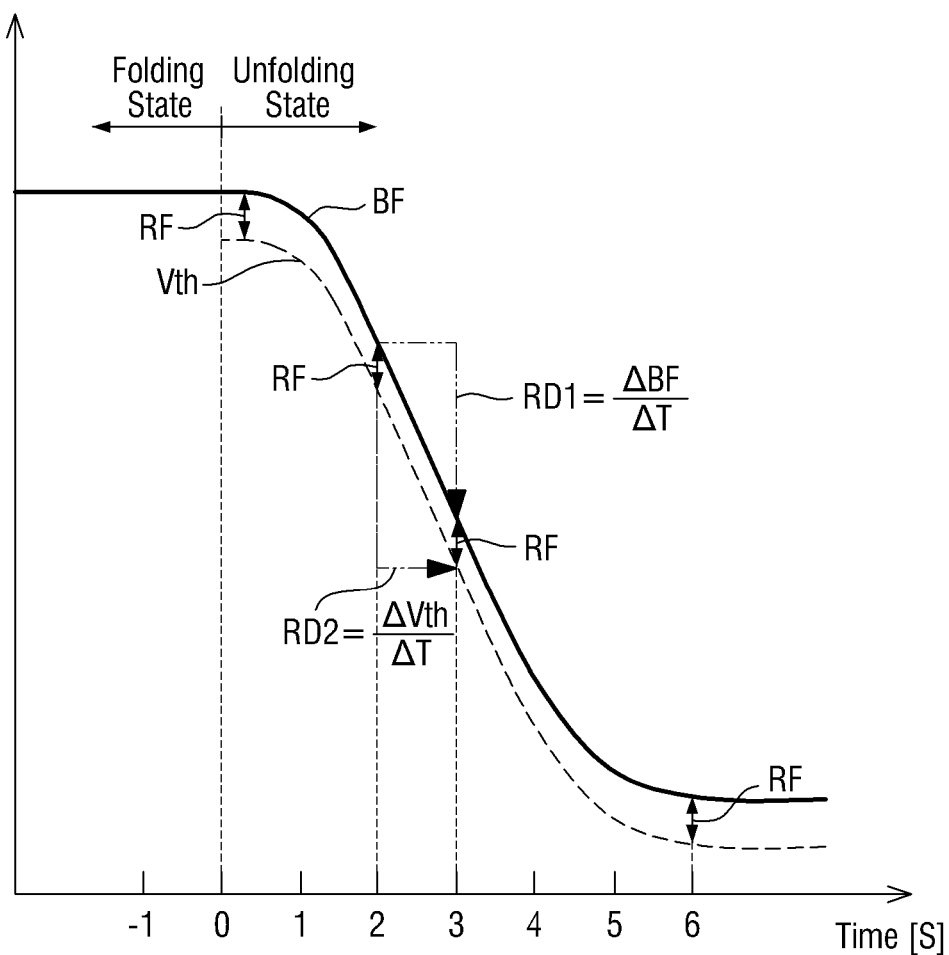
FIG. 11 is a graph showing a base force and a threshold voltage of a plurality of second touch cells in the display device according to an embodiment.
Figure 12:
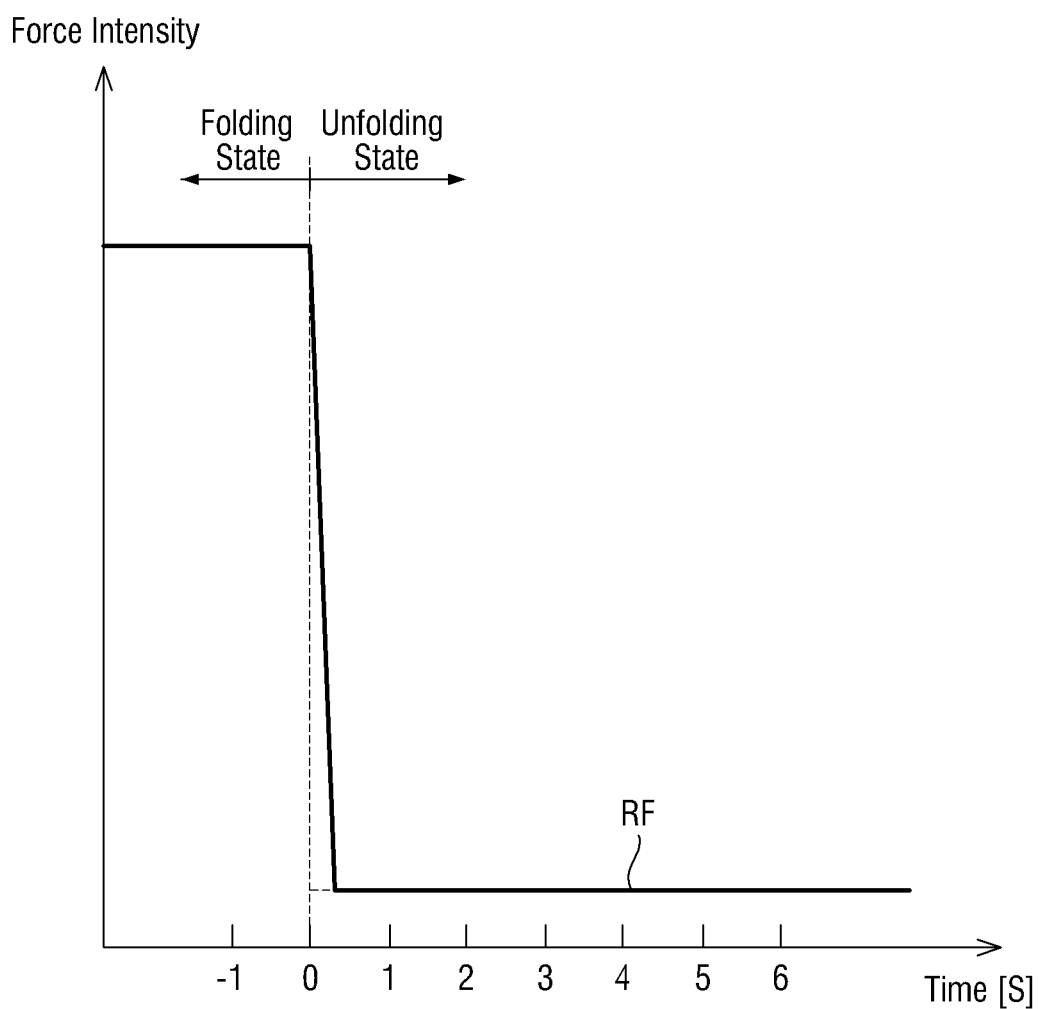
FIG. 12 is a graph showing a reference force of the plurality of second touch cells in the display device according to an embodiment.
Figure 13:
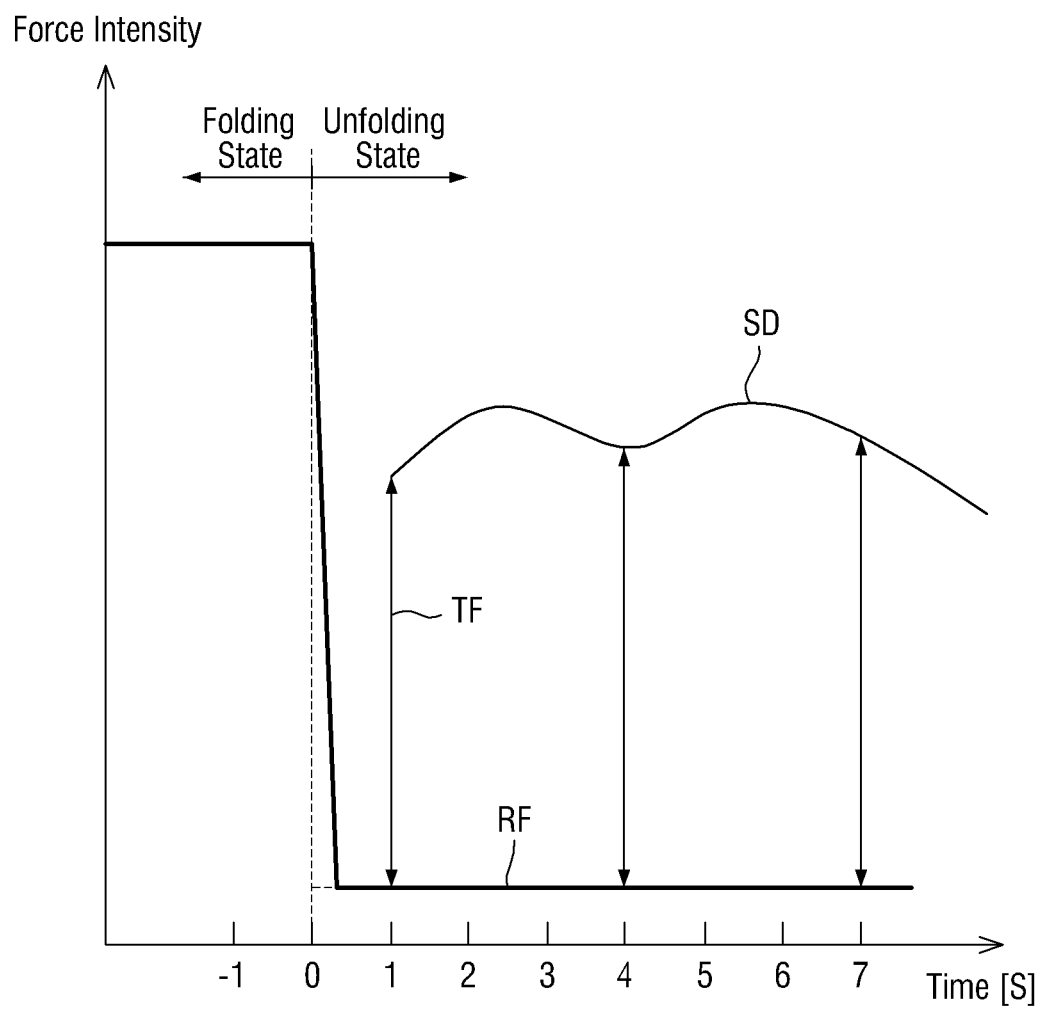
FIG. 13 is a graph showing a touch force exerted on the plurality of second touch cells in the display device according to an embodiment.

FIG. 10 is a view illustrating a touch driver of the display device according to an embodiment. FIG. 11 is a graph showing a base force and a threshold voltage of a plurality of second touch cells in the display device according to an embodiment, FIG. 12 is a graph showing a reference force of the plurality of second touch cells in the display device according to an embodiment, and FIG. 13 is a graph showing a touch force exerted on the plurality of second touch cells in the display device according to an embodiment. Here, in the graphs of FIGS. 11 to 13, the X-axis represents time in units of seconds, and the Y-axis represents an intensity of a force exerted on the plurality of second touch cells CE2. Also, the graph of FIG. 11 showing a threshold voltage Vth shows relative values of values resulting from converting an intensity of a base force BF to a voltage. The values in the graphs illustrated in FIGS. 11 to 13 are for describing the present disclosure, and configurations and aspects of the present disclosure are not limited by the values in the graphs.

Referring to FIGS. 10 to 13, the touch driver TIC may include a base force detector 510, a threshold voltage controller 520, and a touch force detector 530.

The base force detector 510 may detect the intensity of a base force BF of the plurality of second touch cells CE2 when the folding area FA of the second display panel 210 is changed from a folding state to an unfolding state. For example, the plurality of second touch cells CE2 of the second force sensor 230 may be folded together with the folding area FA of the second display panel 210, and thus the base force may increase due to structural characteristics of folding. Here, the base force may correspond to a force applied to or remaining in the plurality of second touch cells CE2 due to the structural characteristics. When the folding area FA of the second display panel 210 is changed from a folding state to an unfolding state, the base force BF of the plurality of second touch cells CE2 that exist in the folding state may remain temporarily. In FIG. 11, the base force BF of the plurality of second touch cells CE2 may remain for six seconds after the folding area FA is changed from the folding state to the unfolding state. For example, after the folding area FA is changed from the folding state to the unfolding state, it may take approximately or about six seconds (6s) for the intensity of the base force BF to return substantially to its original intensity (i.e., the intensity of the base force BF of the folding area FA before it changed from the unfolding state to the folding state). The base force detector 510 may detect the intensity of the base force BF of the plurality of second touch cells CE2 and supply the detected intensity to the threshold voltage controller 520.

The threshold voltage controller 520 may control the threshold voltage Vth of the plurality of second touch cells CE2 on the basis of the intensity of the base force BF of the plurality of second touch cells CE2. When the folding area FA is changed from the folding state to the unfolding state, the threshold voltage controller 520 may control the threshold voltage Vth so that the size of reference force RF, which is a difference between the intensity of the base force BF and the magnitude of the threshold voltage Vth of the plurality of second touch cells CE2, is constant (e.g., substantially constant).

When the folding area FA is changed from the folding state to the unfolding state, the threshold voltage controller 520 may control a reduction rate RD2 of the threshold voltage Vth of the plurality of second touch cells CE2 on the basis of a reduction rate RD1 of the base force BF of the plurality of second touch cells CE2. Here, the reduction rate RD1 of the base force BF may correspond to a change amount of the base force BF per unit time (RD1=ΔBF/ΔT), and the reduction rate RD2 of the threshold voltage Vth may correspond to a change amount of the threshold voltage Vth per unit time (RD2=ΔVth/ΔT). In FIG. 11, the threshold voltage controller 520 may control the threshold voltage Vth of the plurality of second touch cells CE2 on the basis of the base force BF of the plurality of second touch cells CE2 during a first period (0 s to 6 s), which is immediately after the folding area FA is changed from the folding state to the unfolding state, and may maintain the threshold voltage Vth of the plurality of second touch cells CE2 constant (e.g., substantially constant) during a second period (after 6 s) in which the base force BF of the plurality of second touch cells CE2 are maintained constant (e.g., substantially constant). The threshold voltage controller 520 may control the reduction rate RD2 of the threshold voltage Vth of the plurality of second touch cells CE2 to be substantially identical to the reduction rate RD1 of the base force BF of the plurality of second touch cells CE2 during the first period (0 s to 6 s) and maintain the threshold voltage Vth constant (e.g., substantially constant) during the second period (after 6 s). Therefore, the threshold voltage controller 520 may maintain the reference force RF of the plurality of second touch cells CE2 constant (e.g., substantially constant).

When the folding area FA is changed from the folding state to the unfolding state, the threshold voltage controller

520 may control the threshold voltage Vth of the plurality of second touch cells CE2 so that the difference (e.g., the reference force RF) between the intensity of the base force BF of the plurality of second touch cells CE2 and the magnitude of the threshold voltage Vth of the plurality of second touch cells CE2 is substantially equal to a difference between the intensity of a base force of the plurality of first touch cells CE1 and the size of a threshold voltage of the plurality of first touch cells CE1. Because the first area A1 and/or the second area A2 of the second display panel 210 is neither folded nor unfolded (e.g., is not configured to be foldable), the base force of the plurality of first touch cells CE1 may not change due to the folding of the second display panel 210. For example, the base force of the plurality of first touch cells CE1 may be equal or substantially equal to the base force BF of the plurality of second touch cells CE2 after six seconds, as shown in FIG. 11. Therefore, the base force of the plurality of first touch cells CE1 may be maintained constant (e.g., substantially constant) unless the base force receive a separate external force, and the threshold voltage of the plurality of first touch cells CE1 may also be maintained constant (e.g., substantially constant). Thus, a reference force of the plurality of first touch cells CE1 may be maintained constant (e.g., substantially constant). Also, when the folding area FA is changed from the folding state to the unfolding state, the threshold voltage controller 520 may maintain the reference force RF of the plurality of second touch cells CE2 to be substantially identical to the reference force of the plurality of first touch cells CE1 to remove an afterimage by force due to folding of the second display unit 200. By removing the afterimage by force due to the folding of the second display unit 200, the display device according to the present disclosure may prevent or reduce malfunction of the second force sensor 230 and improve sensitivity of the second force sensor 230.

The touch force detector 530 may receive sensing data SD from the plurality of touch cells CE through the sensing line RL. The sensing data SD of each of the plurality of touch cells CE may include information on a force exerted at a position of the corresponding touch cell CE. For example, the sensing data SD may include (e.g., be) the intensity of the force in the touch cells CE. For example, in some embodiments, the sensing data SD of a touch cell may be the sum of the intensity of the base force BF in the touch cell and the external force of the user's touch. The touch force detector 530 may receive the sensing data SD exceeding the size of the reference force RF and detect a touch force TF exerted on the plurality of second touch cells CE2. For example, in some embodiments, the force detector 530 may receive the sensing data SD of all the touch cells to determine which touching cells have sensing data SD having a size exceeding the intensity of the reference force RF, or the force detector 530 may only receive the sensing data SD of touch cells having a size of sensing data SD exceeding the reference force RF. Here, the touch force TF may correspond to a difference between the size of the sensing data SD and the intensity of the reference force RF. Because the reference force RF may be maintained constant (e.g., substantially constant) immediately after the folding area FA is changed from the folding state to the unfolding state, the touch force detector 530 may precisely detect the touch force TF exerted by the user. Therefore, by removing an afterimage by force due to the folding of the second display unit 200, the touch driver TIC may prevent or reduce malfunction of the second force sensor 230 and improve sensitivity of the second force sensor 230.

Figure 14:
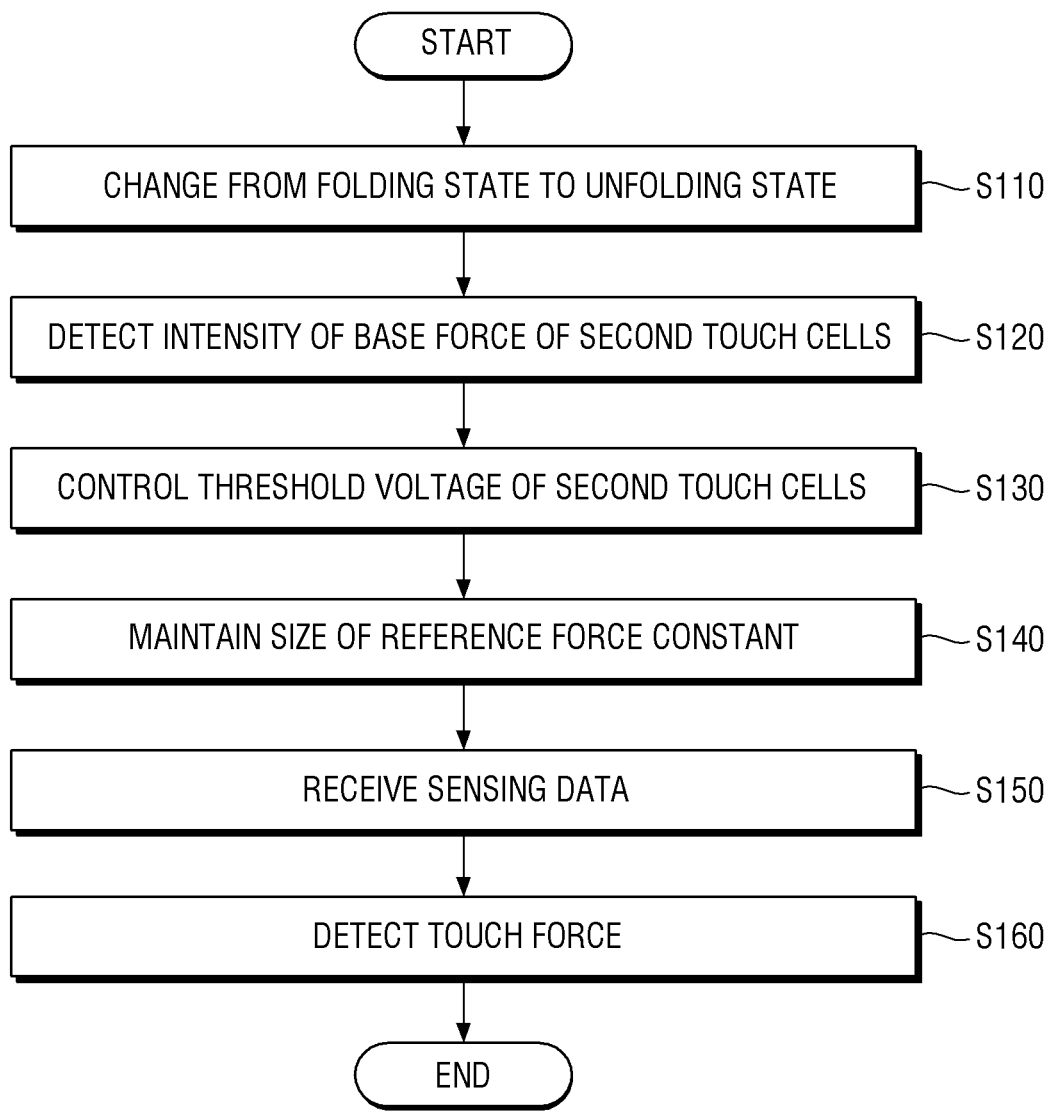
FIG. 14 is a flowchart illustrating a process of detecting a touch force in the display device according to an embodiment.

FIG. 14 is a flowchart illustrating a process of detecting a touch force in the display device according to an embodiment.

Referring to FIG. 14, the second display unit 200 may be folded as illustrated in FIG. 1 or unfolded as illustrated in FIG. 2 according to a state of the folding area FA.

The folding area FA of the second display panel 210 may be changed from the folding state to the unfolding state, and the second force sensor 230 may be changed from the folding state to the unfolding state together with the folding area FA of the second display panel 210 (Act S110). The base force BF of the plurality of second touch cells CE2 disposed to overlap the folding area FA may be increased due to structural characteristics of folding.

When the folding area FA of the second display panel 210 is changed from the folding state to the unfolding state, the base force detector 510 may detect the intensity of the base force BF of the plurality of second touch cells CE2 (Act S120). When the folding area FA of the second display panel 210 is changed from the folding state to the unfolding state, the base force BF of the plurality of second touch cells CE2 that exist in the folding state may remain temporarily.

When the folding area FA is changed from the folding state to the unfolding state, the threshold voltage controller 520 may control the threshold voltage Vth of the plurality of second touch cells CE2 on the basis of the intensity of the base force BF of the plurality of second touch cells CE2 (Act S130).

By controlling the threshold voltage Vth of the plurality of second touch cells CE2, the threshold voltage controller 520 may maintain the size of the reference force RF, which is a difference between the intensity of the base force BF and the magnitude of the threshold voltage Vth of the plurality of second touch cells CE2, constant (e.g., substantially constant) (Act S140).

The touch force detector 530 may receive the sensing data SD from the plurality of touch cells CE through the sensing line RL (Act S150).

The touch force detector 530 may receive the sensing data SD exceeding the size of the reference force RF and detect the touch force TF exerted on the plurality of second touch cells CE2 (Act S160). Here, the touch force TF may correspond to the difference between the size of the sensing data SD and the intensity of the reference force RF.

Therefore, by removing an afterimage by force due to the folding of the second display unit 200, the touch driver TIC may prevent or reduce malfunction of the second force sensor 230 and improve sensitivity of the second force sensor 230.

Figure 15:
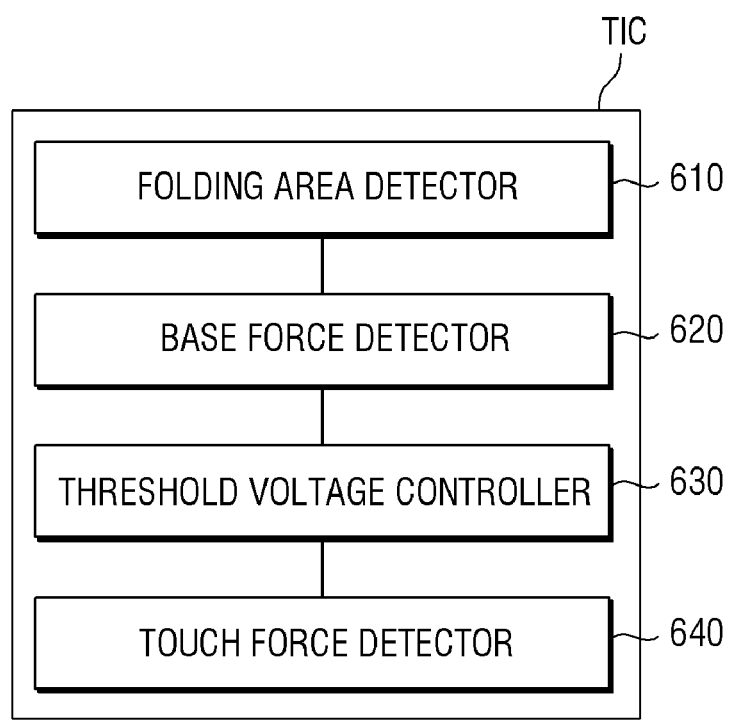
FIG. 15 is a view illustrating a touch driver of a display device according to another embodiment.
Figure 16:
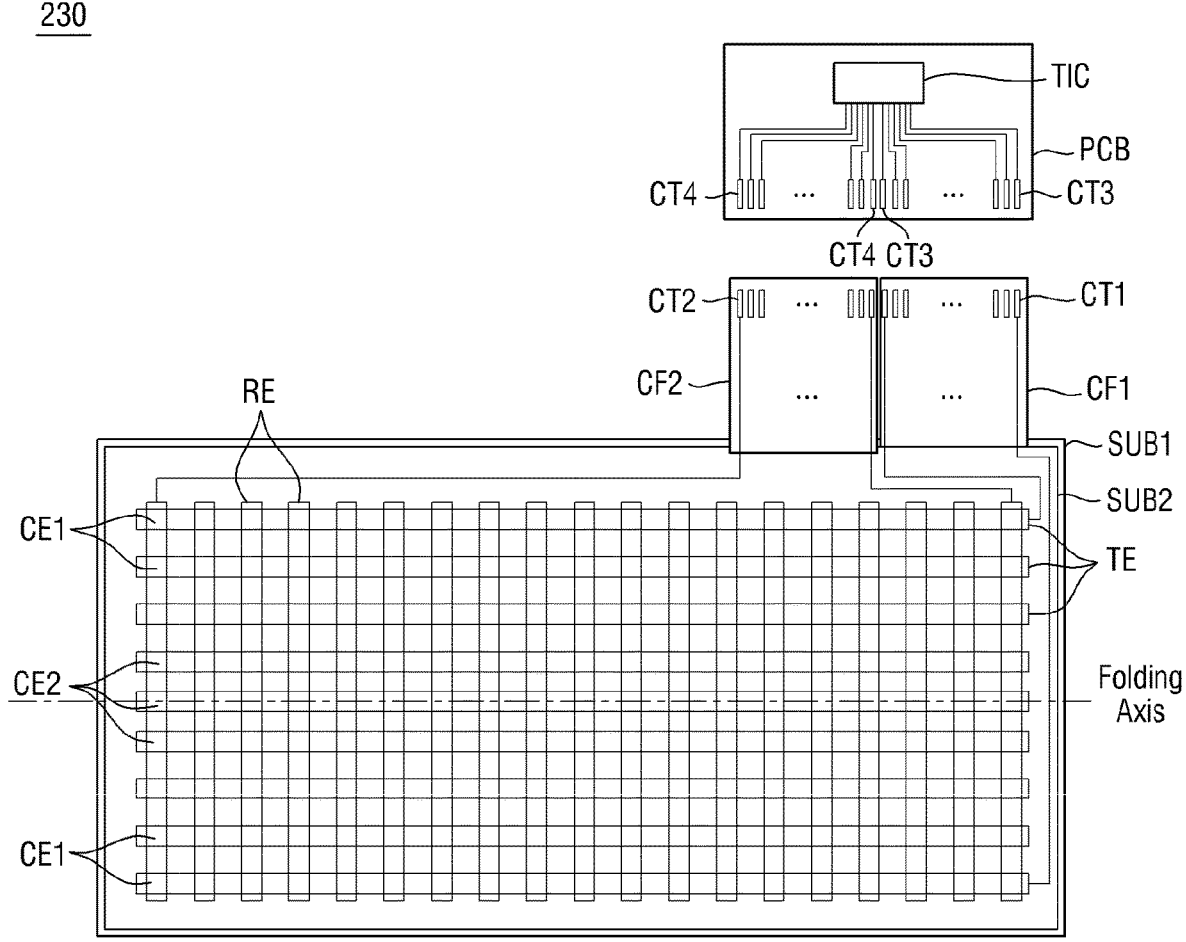
FIG. 16 is a view illustrating a force sensor folded in one direction in the display device according to another embodiment.
Figure 17:
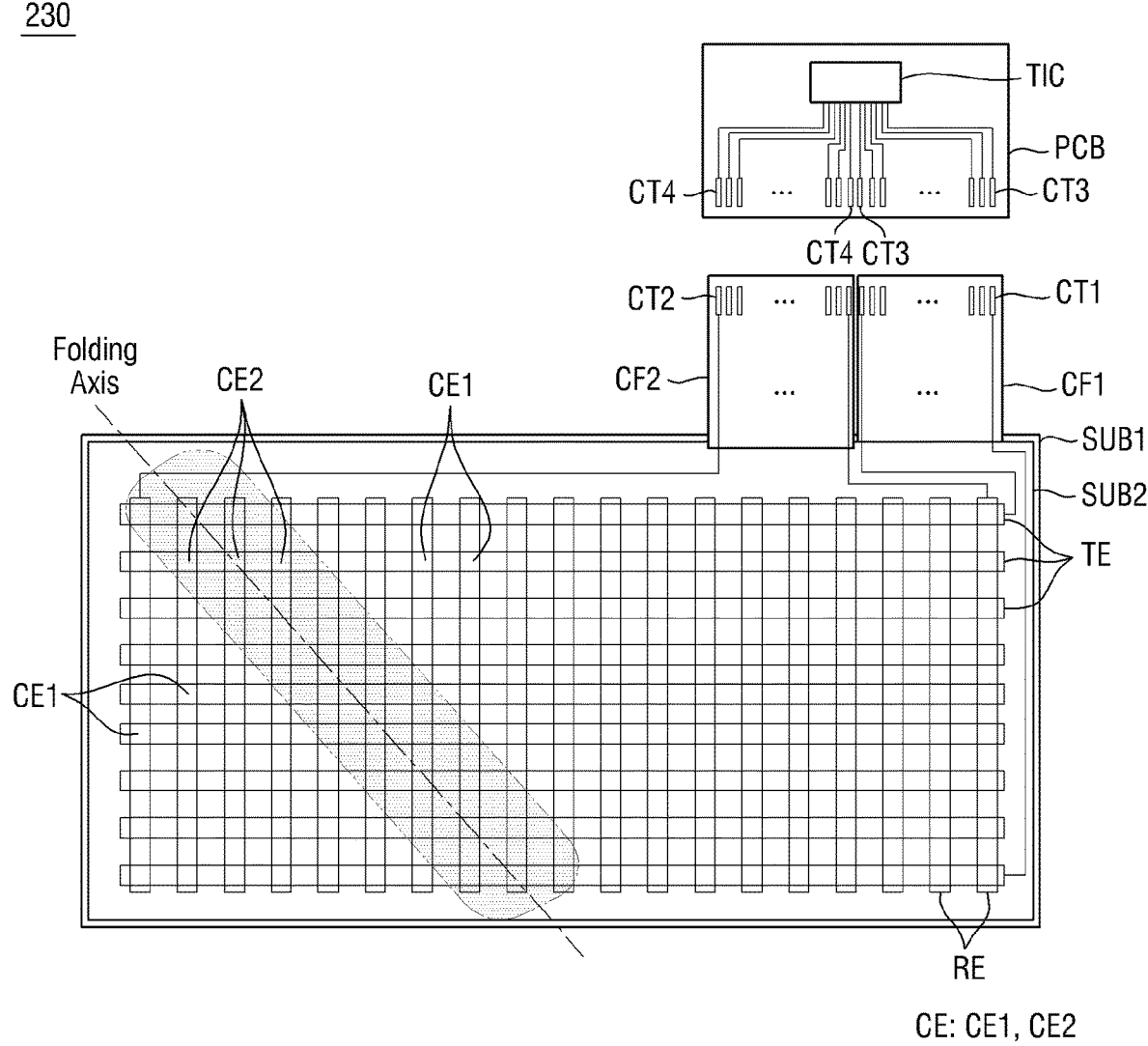
FIG. 17 is a view illustrating a force sensor folded in another direction in the display device according to another embodiment.

FIG. 15 is a view illustrating a touch driver of a display device according to another embodiment. FIG. 16 is a view illustrating a force sensor folded in one direction in the display device according to another embodiment, and FIG. 17 is a view illustrating a force sensor folded in another direction in the display device according to another embodiment. A touch driver TIC of FIGS. 15 to 17 further includes a folding area detector 610. Descriptions of other configurations identical to those described above will be briefly given or may not be repeated. Also, a second display unit 200 of the display device according to another embodiment illustrated in FIGS. 15 to 17 may be folded in any one direction of a plurality of directions.

Referring to FIGS. 15 to 17, the touch driver TIC may include the folding area detector 610, a base force detector 620, a threshold voltage controller 630, and a touch force detector 640.

When a second display panel 210 is changed from the folding state to the unfolding state, the folding area detector 610 may detect some touch cells whose base force BF is increased (e.g., is greater than the base force of the first touch cells CE1) from among a plurality of touch cells CE. For example, the second force sensor 230 of FIG. 9 may be folded along a folding axis in a short-side direction (Y-axis direction), the second force sensor 230 of FIG. 16 may be folded along a folding axis in a long-side direction (X-axis direction), and the second force sensor 230 of FIG. 17 may be folded along a folding axis in a diagonal or oblique direction between the short-side direction (Y-axis direction) and the long-side direction (X-axis direction). When the second force sensor 230 is folded in any one direction of the plurality of directions, the folding area detector 610 may detect some touch cells CE whose base force BF is increased.

Associating FIG. 15 with FIG. 9, when the second display panel 210 is folded along the folding axis in the short-side direction (Y-axis direction), the second force sensor 230 may also be folded along the folding axis in the short-side direction (Y-axis direction). In this case, the folding area FA of the second display panel 210 may be determined according to the folding axis, the plurality of first touch cells CE1 may overlap a non-folding area (for example, the first area A1 and/or the second area A2) of the second display panel 210, and the plurality of second touch cells CE2 may overlap the folding area FA. Therefore, the folding area detector 610 may detect the plurality of second touch cells CE2 arranged along the folding axis in the short-side direction (Y-axis direction). For example, the plurality of second touch cells CE2 may be arranged along three columns, but the present disclosure is not limited thereto. When the folding area FA of the second display panel 210 becomes larger, the number of the plurality of second touch cells CE2 of the second force sensor 230 may also increase. The plurality of first touch cells CE1 may be disposed at the left side or the right side of the plurality of second touch cells CE2.

Associating FIG. 15 with FIG. 16, when the second display panel 210 is folded along the folding axis in the long-side direction (X-axis direction), the second force sensor 230 may also be folded along the folding axis in the long-side direction (X-axis direction). In this case, the folding area FA of the second display panel 210 may be determined according to the folding axis, the plurality of first touch cells CE1 may overlap the non-folding area (for example, the first area A1 and/or the second area A2, which may be on either side of the folding area FA in FIG. 16) of the second display panel 210, and the plurality of second touch cells CE2 may overlap the folding area FA. Therefore, the folding area detector 610 may detect the plurality of second touch cells CE2 arranged along the folding axis in the long-side direction (X-axis direction). For example, the plurality of second touch cells CE2 may be arranged along three columns or rows, but the present disclosure is not limited thereto. When the folding area FA of the second display panel 210 becomes larger, the number of the plurality of second touch cells CE2 of the second force sensor 230 may also increase. The plurality of first touch cells CE1 may be disposed at the upper side and/or the lower side of the plurality of second touch cells CE2.

Associating FIG. 15 with FIG. 17, when the second display panel 210 is folded along the folding axis in the diagonal or oblique direction between the short-side direction (Y-axis direction) and the long-side direction (X-axis direction), the second force sensor 230 may also be folded along the folding axis in the diagonal or oblique direction. In this case, the folding area FA of the second display panel 210 may be determined according to the folding axis, the plurality of first touch cells CE1 may overlap the non-folding area (for example, the first area A1 and/or the second area A2, which may be on either side of the folding area FA in FIG. 17) of the second display panel 210, and the plurality of second touch cells CE2 may overlap the folding area FA. Therefore, the folding area detector 610 may detect the plurality of second touch cells CE2 arranged along the folding axis in the diagonal or oblique direction. When the folding area FA of the second display panel 210 becomes larger, the number of the plurality of second touch cells CE2 of the second force sensor 230 may also increase. The plurality of first touch cells CE1 may be disposed at the upper right side and/or the lower left side of the plurality of second touch cells CE2.

When the folding area FA of the second display panel 210 is changed from the folding state to the unfolding state, the base force detector 620 may detect the intensity of a base force BF of some second touch cells CE2 whose base force BF is increased (e.g., is greater than the base force of the first touch cells CE1) among the plurality of second touch cells CE2. In the second force sensor 230 of FIG. 9, the base force detector 620 may detect the intensity of the base force BF of the plurality of second touch cells CE2 arranged along the folding axis in the short-side direction (Y-axis direction). In the second force sensor 230 of FIG. 16, the base force detector 620 may detect the intensity of the base force BF of the plurality of second touch cells CE2 arranged along the folding axis in the long-side direction (X-axis direction). In the second force sensor 230 of FIG. 17, the base force detector 620 may detect the intensity of the base force BF of the plurality of second touch cells CE2 arranged along the folding axis in the diagonal or oblique direction between the short-side direction (Y-axis direction) and the long-side direction (X-axis direction). The base force detector 620 may detect the intensity of the base force BF of the plurality of second touch cells CE2 and supply the detected intensity to the threshold voltage controller 630.

The threshold voltage controller 630 may control a threshold voltage Vth of the second touch cells CE2 whose base force BF is increased (e.g., is greater than the base force of the first touch cells CE1), on the basis of the intensity of the base force BF of the second touch cells CE2 whose base force BF is increased. When the folding area FA is changed from the folding state to the unfolding state, the threshold voltage controller 630 may control the threshold voltage Vth so that the size of reference force RF, which is a difference between the intensity of the base force BF and the magnitude of the threshold voltage Vth of the plurality of second touch cells CE2, is constant (e.g., substantially constant). When the folding area FA is changed from the folding state to the unfolding state, the threshold voltage controller 630 may control a reduction rate RD2 of the threshold voltage Vth of the plurality of second touch cells CE2 on the basis of a reduction rate RD1 of the base force BF of the plurality of second touch cells CE2.

The touch force detector 640 may receive sensing data SD from the plurality of touch cells CE through the sensing line RL. The touch force detector 640 may receive the sensing data SD exceeding the size of the reference force RF and detect a touch force TF exerted on the second touch cells CE2 whose base force BF is increased (e.g., is greater than the base force of the first touch cells CE1). Therefore, by removing an afterimage by force due to folding of the second display unit 200, the touch driver TIC may prevent or reduce malfunction of the second force sensor 230 and improve sensitivity of the second force sensor 230.

Figure 18:
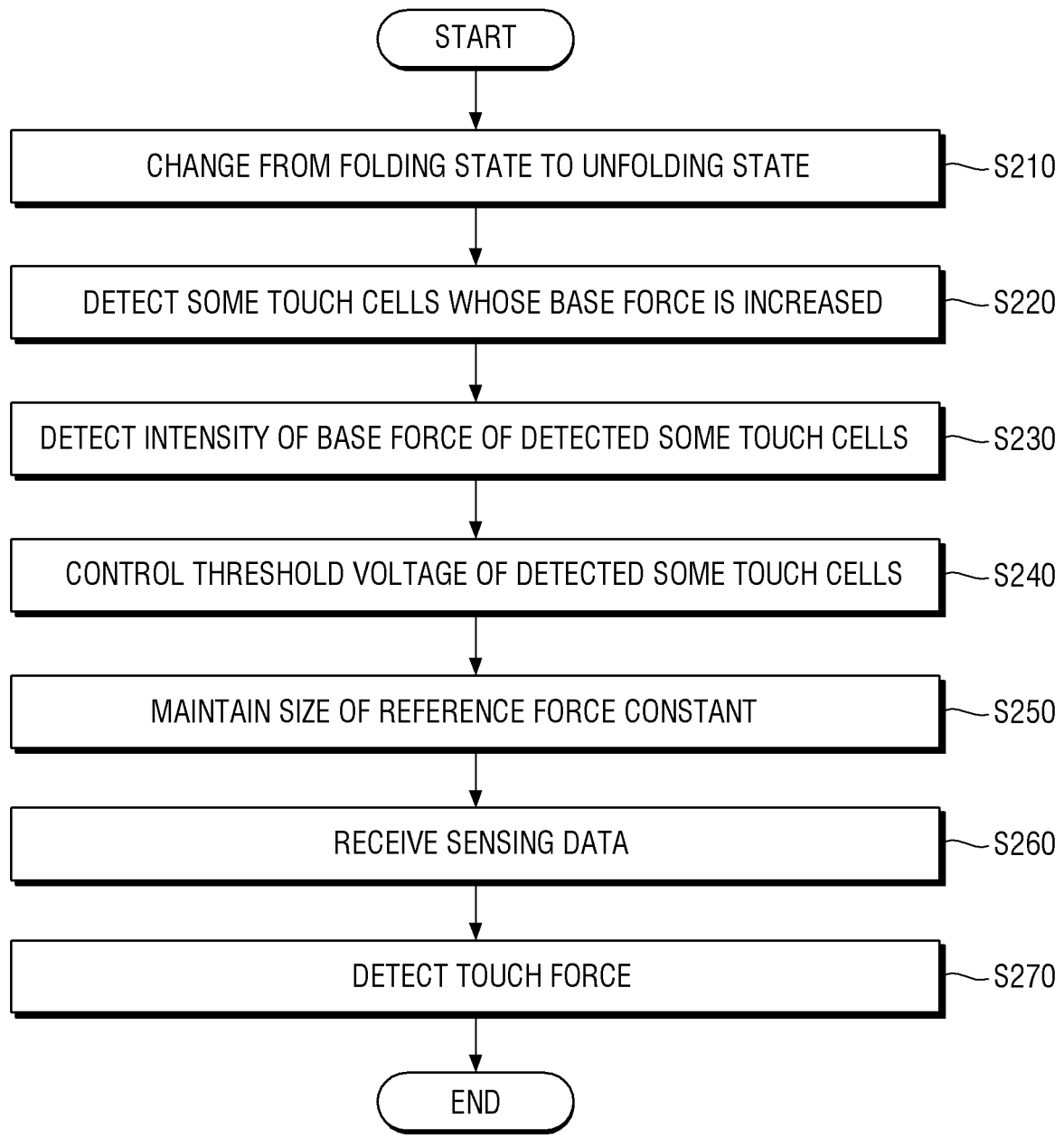
FIG. 18 is a flowchart illustrating a process of detecting a touch force in the display device according to another embodiment.

FIG. 18 is a flowchart illustrating a process of detecting a touch force in the display device according to another embodiment.

Referring to FIG. 18, the second force sensor 230 may be folded or unfolded in any one direction of a plurality of directions. For example, the second force sensor 230 may be folded along the folding axis in the short-side direction (Y-axis direction) as illustrated in FIG. 9, folded along the folding axis in the long-side direction (X-axis direction) as illustrated in FIG. 16, or folded along the folding axis in the diagonal or oblique direction between the short-side direction (Y-axis direction) and the long-side direction (X-axis direction) as illustrated in FIG. 17.

The folding area FA of the second display panel 210 may be changed from the folding state to the unfolding state, and the second force sensor 230 may be changed from the folding state to the unfolding state together with the folding area FA of the second display panel 210 (Act S210).

The folding area detector 610 may detect some touch cells whose base force BF is increased among the plurality of touch cells CE (Act S220). For example, the folding area detector 610 may detect the plurality of second touch cells CE2 arranged along the folding axis in the short-side direction (Y-axis direction) in the second force sensor 230 of FIG. 9. The folding area detector 610 may detect the plurality of second touch cells CE2 arranged along the folding axis in the long-side direction (X-axis direction) in the second force sensor 230 of FIG. 16. The folding area detector 610 may detect the plurality of second touch cells CE2 arranged along the folding axis in the diagonal or oblique direction between the short-side direction (Y-axis direction) and the long-side direction (X-axis direction) in the second force sensor 230 of FIG. 17.

When the folding area FA of the second display panel 210 is changed from the folding state to the unfolding state, the base force detector 620 may detect the intensity of the base force BF of some second touch cells CE2 whose base force BF is increased (Act S230). When the folding area FA of the second display panel 210 is changed from the folding state to the unfolding state, the base force BF of the plurality of second touch cells CE2 that exist in the folding state may remain temporarily.

When the folding area FA is changed from the folding state to the unfolding state, the threshold voltage controller 630 may control the threshold voltage Vth of the second touch cells CE2 whose base force BF is increased, on the basis of the intensity of the base force BF of the second touch cells CE2 whose base force BF is increased (Act S240).

By controlling the threshold voltage Vth of the second touch cells CE2 whose base force BF is increased, the threshold voltage controller 630 may maintain the size of reference force RF, which is a difference between the intensity of the base force BF and the magnitude of the threshold voltage Vth of the second touch cells CE2 whose base force BF is increased, constant (e.g., substantially constant) (Act S250).

The touch force detector 640 may receive sensing data SD from the plurality of touch cells CE through the sensing line RL (Act S260).

The touch force detector 640 may receive the sensing data SD exceeding the size of the reference force RF and detect a touch force TF exerted on the second touch cells CE2 whose base force BF is increased (Act S270).

Therefore, by removing an afterimage by force due to the folding of the second display unit 200, the touch driver TIC may prevent or reduce malfunction of the second force sensor 230 and may improve sensitivity of the second force sensor 230.

Figure 19:
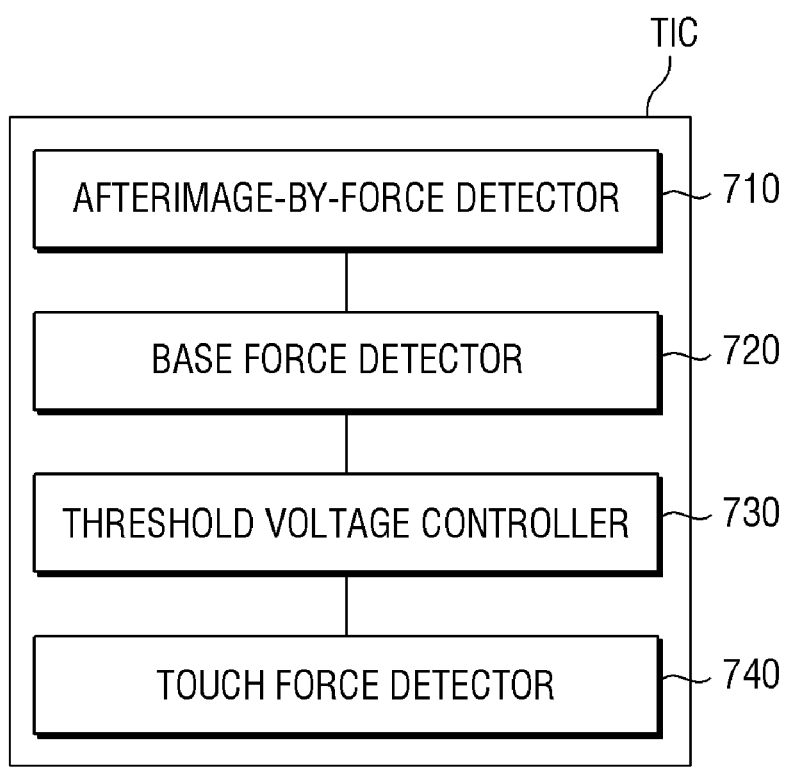
FIG. 19 is a view illustrating a touch driver of a display device according to still another embodiment.
Figure 20:
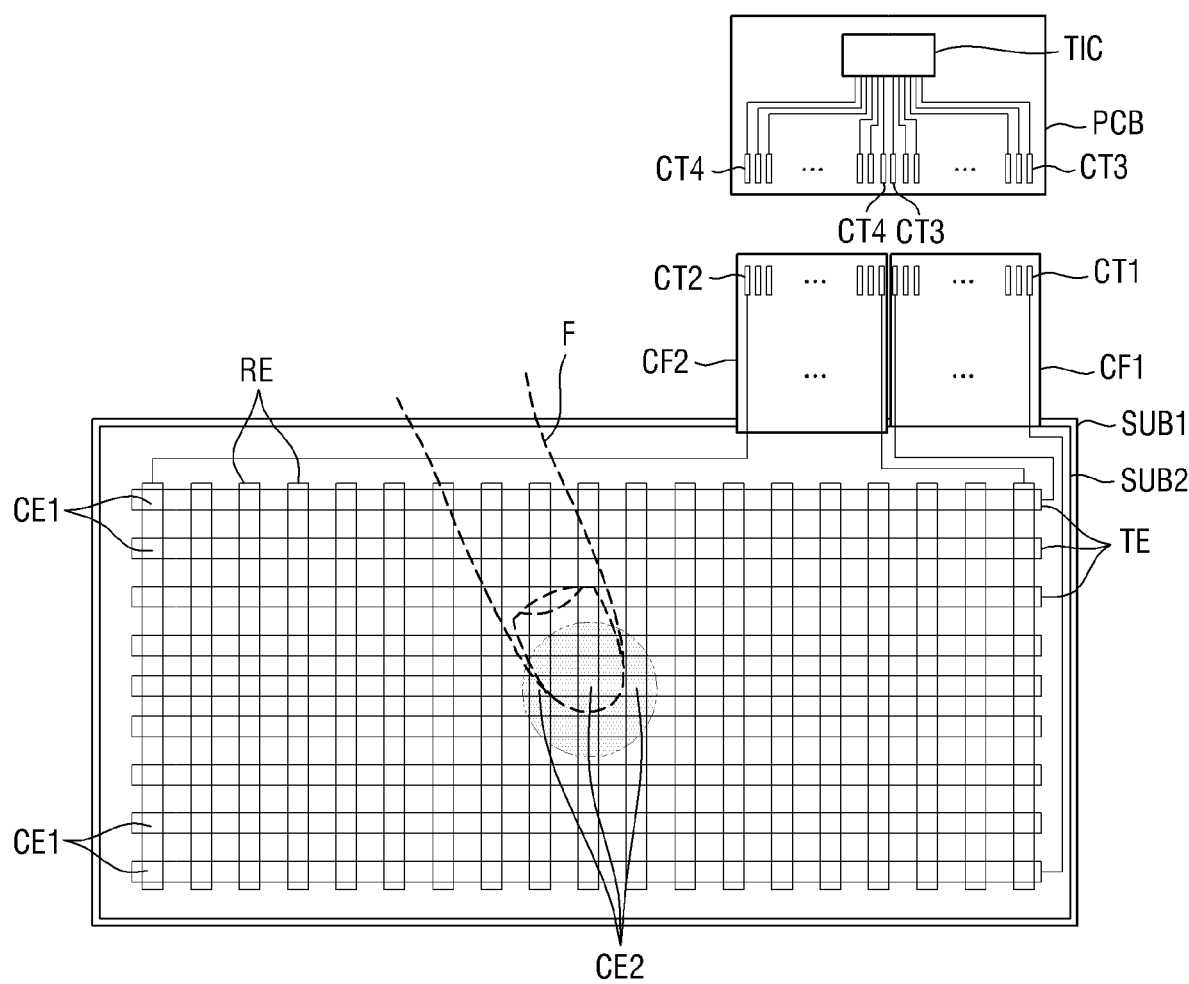
FIG. 20 is a view for describing the occurrence of an afterimage by force due to a touch in the display device according to still another embodiment.

FIG. 19 is a view illustrating a touch driver of a display device according to still another embodiment, and FIG. 20 is a view for describing the occurrence of an afterimage by force due to a touch in the display device according to still another embodiment. A touch driver TIC of FIGS. 19 and 20 is for proposing and describing a method of dealing with an increase in a base force due to a touch force irrelevant to folding of the second display unit 200. Descriptions of configurations identical to those described above will be briefly given or may not be repeated. Therefore, in the second display unit 200 of the display device according to still another embodiment illustrated in FIGS. 19 and 20, a base force BF may increase due to a user's touch F, and the base force BF may remain temporarily (e.g., may temporarily remain higher than the base force of the first touch cells CE1) even when the user's touch is stopped. For example, after the user's touch F is stopped, the increased base force BF of second touch cells CE2 at the user's touch F (e.g., overlapping an area where the user's touch F occurred) may gradually return over a period of time (e.g., six seconds) to the intensity of the base force prior to the user's touch F.

Referring to FIGS. 19 and 20, the touch driver TIC may include an afterimage-by-force detector 710, a base force detector 720, a threshold voltage controller 730, and a touch force detector 740.

The afterimage-by-force detector 710 may detect some touch cells CE whose base force BF is relatively increased among a plurality of touch cells CE. The afterimage-by-force detector 710 may detect some touch cells whose base force BF is increased to exceed a set force during a reference time (e.g., whose base force BF exceeds the set force for at least a period of time equal to a reference time) among the plurality of touch cells CE (e.g., to result in a reference force that is no longer the constant reference force RF. For example, when the user's touch F applies an excessive force on the second display unit 200, the intensity of the base force BF may increase due to structural characteristics of the second force sensor 230. In this case, even when the user's touch on the second force sensor 230 is stopped, the base force BF may remain temporarily (e.g., may temporarily remain higher than the base force of the first touch cells CE1). The base force BF remaining temporarily may decrease according to a set or predetermined reduction rate RD1. When the base force BF remaining temporarily exceeds the set force for the reference time, the afterimage-by-force detector 710 may detect the touch cells CE whose base force BF is increased (e.g., is greater than the base force of the first touch cells CE1).

In FIG. 20, when the user's touch applies an excessive force on the second force sensor 230, the afterimage-by-force detector 710 may detect some second touch cells CE2 whose base force BF is increased among the plurality of touch cells CE. For example, when the user's touch F applies an excessive force to the second force sensor 230, even after the user's touch on the second force sensor 230 is stopped, the base force BF may remain temporarily (e.g., may temporarily remain higher than the base force of the first touch cells CE1) due to the structural characteristics of the second force sensor 230. In this case, the plurality of first touch cells CE1 may have a constant (e.g., substantially constant) base force BF due to not receiving a touch force from the user, and the plurality of second touch cells CE2 may have an increasing base force BF due to receiving an excessive touch force from the user. Therefore, the afterimage-by-force detector 710 may detect a plurality of second touch cells CE2 whose base force BF exceeds the set force for the reference time among the plurality of touch cells CE.

After the user's touch is stopped, the base force detector 720 may detect the intensity of the base force BF of the second touch cells CE2 whose base force BF is increased (e.g., is greater than the base force of the first touch cells CE1). In the second force sensor 230 of FIG. 20, the base force detector 720 may detect the intensity of the base force BF of the plurality of second touch cells CE2 overlapping an area in which the user's touch is made. The base force detector 720 may detect the intensity of the base force BF of the plurality of second touch cells CE2 and supply the detected intensity to the threshold voltage controller 730.

The threshold voltage controller 730 may control, on the basis of the intensity of the base force BF of the second touch cells CE2 whose base force BF is increased (e.g., is greater than the base force of the first touch cells CE1), a threshold voltage Vth of the second touch cells CE2. When second touch cells CE2 whose base force BF exceeds the set force for the reference time are detected, the threshold voltage controller 730 may control the threshold voltage Vth so that the size of reference force RF, which is a difference between the intensity of the base force BF and the magnitude of the threshold voltage Vth of the detected second touch cells CE2, is constant (e.g., substantially constant). For example, after the user's touch is stopped, the threshold voltage controller 730 may control a reduction rate RD2 of the threshold voltage Vth of the plurality of second touch cells CE2 on the basis of a reduction rate RD1 of the base force BF of the plurality of second touch cells CE2.

The touch force detector 740 may receive sensing data SD from the plurality of touch cells CE through the sensing line RL. The touch force detector 740 may receive the sensing data SD exceeding the size of the reference force RF and detect a touch force TF exerted on the second touch cells CE2 whose base force BF is increased (e.g., is greater than the base force of the first touch cells CE1). Therefore, by removing an afterimage by force due to folding of the second display unit 200 and/or due to the user's touch, the touch driver TIC may prevent or reduce malfunction of the second force sensor 230 and improve sensitivity of the second force sensor 230.

Figure 21:
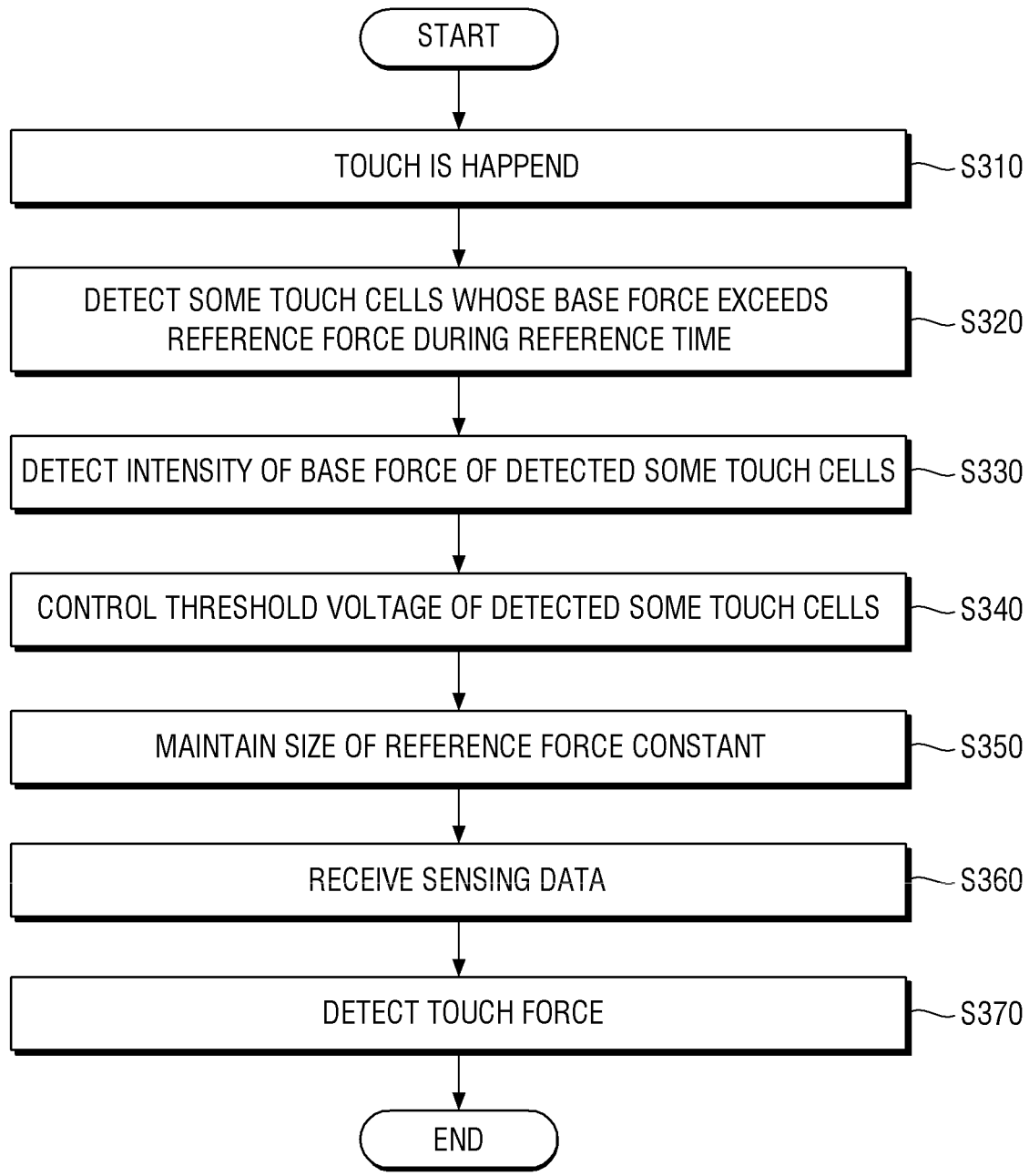
FIG. 21 is a flowchart illustrating a process of detecting a touch force in the display device according to still another embodiment.

FIG. 21 is a flowchart illustrating a process of detecting a touch force in the display device according to still another embodiment.

Referring to FIG. 21, when the second force sensor 230 receives an excessive touch force from the user, the intensity of the base force BF may be increased (Act S310). In this case, even when the user's touch on the second force sensor 230 is stopped, the base force BF may remain temporarily (e.g., may temporarily remain higher than the base force of the first touch cells CE1).

The afterimage-by-force detector 710 may detect some touch cells CE whose base force BF exceeds a set force during a reference time (Act S320). For example, the plurality of first touch cells CE1 may have a constant (e.g., substantially constant) base force BF due to not receiving a touch force from the user, and the plurality of second touch cells CE2 may have an increasing base force BF due to receiving an excessive touch force from the user.

After the user's touch is stopped, the base force detector 720 may detect the intensity of the base force BF of the second touch cells CE2 whose base force BF is increased (Act S330).

The threshold voltage controller 730 may control, on the basis of the intensity of the base force BF of the second touch cells CE2 whose base force BF is increased, a threshold voltage Vth of the second touch cells CE2 (Act S340).

By controlling the threshold voltage Vth of the second touch cells CE2 whose base force BF exceeds the set force for the reference time, the threshold voltage controller 730 may maintain the size of reference force RF, which is a difference between the intensity of the base force BF and the magnitude of the threshold voltage Vth of the second touch cells CE2 whose base force BF is increased, constant (e.g., substantially constant) (Act S350).

The touch force detector 740 may receive sensing data SD from the plurality of touch cells CE through the sensing line RL (Act S360).

The touch force detector 740 may receive the sensing data SD exceeding the size of the reference force RF and detect a touch force TF exerted on the second touch cells CE2 whose base force BF is increased (Act S370).

Therefore, by removing an afterimage by force due to folding of the second display unit 200 and/or due to the user's touch, the touch driver TIC may prevent or reduce malfunction of the second force sensor 230 and improve sensitivity of the second force sensor 230.

According to a display device according to an embodiment, by controlling a threshold voltage of a plurality of touch cells, which overlap a folding area of a display panel, on the basis of the intensity of a base force of the plurality of touch cells, the size of a reference force of the plurality of touch cells overlapping the folding area can be maintained constant (e.g., substantially constant), and thus malfunction of a force sensor can be prevented or reduced.

According to a display device according to another embodiment, when a display panel is changed from a folding state to an unfolding state, some touch cells whose base force is relatively increased are detected among a plurality of touch cells, and a threshold voltage of the detected some touch cells is controlled on the basis of the intensity of the base force of the detected some touch cells. In this way, the size of a reference force of the detected some touch cells whose base force is relatively increased can be maintained constant (e.g., substantially constant), and thus malfunction of a force sensor can be prevented or reduced.

According to a display device according to still another embodiment, some touch cells whose base force exceeds a set force during a reference time are detected among a plurality of touch cells, and a threshold voltage of the detected some touch cells is controlled on the basis of the intensity of the base force of the detected some touch cells. In this way, the size of a reference force of the detected some touch cells whose base force is relatively increased can be maintained constant (e.g., substantially constant), and thus malfunction of a force sensor can be prevented or reduced.

Aspects according to the embodiments are not limited to those described above, and various other aspects are incorporated herein.

What is claimed is:
1. A display device comprising:
a display panel including a first area, a second area, and a folding area between the first area and the second area; and
a force sensor at one surface of the display panel, wherein the force sensor comprises a plurality of first touch cells overlapping the first area or the second area, a plurality of second touch cells overlapping the folding area, and a touch driver to control a threshold voltage of the plurality of second touch cells on the basis of an intensity of a base force of the plurality of second touch cells in response to a change in a folding state of the display panel.

2. The display device of claim 1, wherein, after the folding area is changed from a folding state to an unfolding state, the touch driver is to control the threshold voltage so that a difference between the intensity of the base force of the plurality of second touch cells and a magnitude of the threshold voltage is constant.

3. The display device of claim 1, wherein, after the folding area is changed from a folding state to an unfolding state, the touch driver is to control the threshold voltage of the plurality of second touch cells so that a difference between the intensity of the base force of the plurality of second touch cells and a magnitude of the threshold voltage of the plurality of second touch cells is substantially identical to a difference between an intensity of a base force of the plurality of first touch cells and a magnitude of a threshold voltage of the plurality of first touch cells.

4. The display device of claim 1, wherein, after the folding area is changed from a folding state to an unfolding state, the touch driver is to control a reduction rate of the threshold voltage of the plurality of second touch cells on the basis of a reduction rate of the base force of the plurality of second touch cells.

5. The display device of claim 1, wherein, during a first period which is immediately after the folding area is changed from a folding state to an unfolding state, the touch driver is to control the threshold voltage of the plurality of second touch cells on the basis of the base force of the plurality of second touch cells, and, during a second period in which the base force of the plurality of second touch cells is constant, the touch driver is to maintain the threshold voltage of the plurality of second touch cells constant.

6. The display device of claim 1, wherein the touch driver comprises:
a base force detector is to detect the intensity of the base force of the plurality of second touch cells after the folding area is changed from a folding state to an unfolding state; and
a threshold voltage controller is to control the threshold voltage of the plurality of second touch cells so that a size of a reference force, which is a difference between the intensity of the base force of the plurality of second touch cells and a magnitude of the threshold voltage of the plurality of second touch cells, is maintained constant.

7. The display device of claim 6, wherein the touch driver further comprises a touch force detector to receive sensing data exceeding the size of the reference force to detect a touch force exerted on the plurality of second touch cells.

8. A display device comprising:
a display panel which is foldable in at least one direction; and
a force sensor at one surface of the display panel, wherein the force sensor comprises:
a plurality of touch cells to sense a touch force, and
a touch driver which, after the display panel is changed from a folding state to an unfolding state, is to detect touch cells whose base force is relatively increased from among the plurality of touch cells to control a threshold voltage of the detected touch cells on the basis of an intensity of the base force of the detected touch cells.

9. The display device of claim 8, wherein, after the display panel is changed from a folding state to an unfolding state in a folding area extending in a direction parallel to a short side of the display panel:
the base force of touch cells that overlap the folding area from among the plurality of touch cells is increased; and
the touch driver is to control a threshold voltage of the touch cells that overlap the folding area, on the basis of the intensity of the base force of the touch cells that overlap the folding area.

10. The display device of claim 8, wherein, after the display panel is changed from a folding state to an unfolding state in a folding area extending in a direction parallel to a long side of the display panel:
the base force of touch cells that overlap the folding area from among the plurality of touch cells is increased; and
the touch driver is to control a threshold voltage of the touch cells that overlap the folding area, on the basis of the intensity of the base force of the touch cells that overlap the folding area.

11. The display device of claim 8, wherein, after the display panel is changed from a folding state to an unfolding state in a folding area extending in a diagonal direction between a short-side direction and a long-side direction of the display panel:
the base force of touch cells that overlap the folding area from among the plurality of touch cells is increased; and
the touch driver is to control a threshold voltage of the touch cells that overlap the folding area, on the basis of the intensity of the base force of the touch cells that overlap the folding area.

12. The display device of claim 8, wherein the touch driver comprises:
a folding area detector to detect touch cells whose base force is increased from among the plurality of touch cells after the display panel is changed from a folding state to an unfolding state;
a base force detector to detect an intensity of the base force of the detected touch cells; and
a threshold voltage controller to control a threshold voltage of the detected touch cells.

13. The display device of claim 12, wherein the threshold voltage controller is to control the threshold voltage of the detected touch cells to maintain a size of a reference force, which is a difference between the intensity of the base force of the detected touch cells and a magnitude of the threshold voltage of the detected touch cells, constant.

14. The display device of claim 13, wherein the touch driver further comprises a touch force detector to receive sensing data exceeding the size of the reference force to detect a touch force exerted on the detected touch cells.

15. A display device comprising:
a foldable display panel to display an image; and
a force sensor at one surface of the display panel, wherein the force sensor comprises:
a plurality of touch cells to sense a touch force, and
a touch driver to detect touch cells whose base force is relatively increased from among the plurality of touch cells to control a threshold voltage of the detected touch cells on the basis of an intensity of the base force of the detected touch cells in response to a change in a folding state of the foldable display.

16. The display device of claim 15, wherein, after the base force of the detected touch cells exceeds a set force during a reference time, the touch driver is to control the threshold voltage of the detected touch cells on the basis of the intensity of the base force of the detected touch cells.

17. The display device of claim 15, wherein, after a size of a reference force, which is a difference between the intensity of the base force of the detected touch cells and a magnitude of the threshold voltage of the detected touch cells, exceeds a size of a set force, the touch driver is to control the threshold voltage to decrease the size of the reference force.

18. The display device of claim 15, wherein, after the base force of the detected touch cells exceeds a set force during a reference time, the touch driver is to control a reduction rate of the threshold voltage of the detected touch cells on the basis of a reduction rate of the base force of the detected touch cells.

19. The display device of claim 15, wherein the touch driver comprises:

an afterimage-by-force detector to detect touch cells whose base force exceeds a set force during a reference time from among the plurality of touch cells;

a base force detector to detect an intensity of the base force of the detected touch cells; and a threshold voltage controller to control the threshold voltage of the detected touch cells so that a size of a reference force, which is a difference between the intensity of the base force of the detected touch cells and a magnitude of the threshold voltage of the detected touch cells, is maintained constant.

20. The display device of claim 19, wherein the touch driver further comprises a touch force detector to receive sensing data exceeding the size of the reference force to detect a touch force exerted on the detected touch cells.

* * * * *